(12) United States Patent
Bruce et al.

(10) Patent No.: US 12,487,945 B2
(45) Date of Patent: Dec. 2, 2025

(54) DATA ELISION

(71) Applicant: Arm Limited, Cambridgeshire (GB)

(72) Inventors: Klas Magnus Bruce, Leander, TX (US); Jamshed Jalal, Austin, TX (US); Håkan Lars-Göran Persson, Bjärred (SE); Phanindra Kumar Mannava, Austin, TX (US)

(73) Assignee: Arm Limited, Cambridge (GB)

( * ) Notice: Subject to any disclaimer, the term of this patent is extended or adjusted under 35 U.S.C. 154(b) by 423 days.

(21) Appl. No.: 17/580,920

(22) Filed: Jan. 21, 2022

(65) Prior Publication Data

US 2023/0236992 A1 Jul. 27, 2023

(51) Int. Cl.
*G06F 13/16* (2006.01)

(52) U.S. Cl.
CPC .................... *G06F 13/16* (2013.01)

(58) Field of Classification Search
CPC ..................................................... G06F 13/16
USPC ........................................................ 710/306
See application file for complete search history.

(56) References Cited

U.S. PATENT DOCUMENTS

| | | | |
|---|---|---|---|
| 4,586,027 A * | 4/1986 | Tsukiyama et al. | |
| 5,361,372 A * | 11/1994 | Rege ................ | H04L 49/90 370/428 |
| 5,920,705 A * | 7/1999 | Lyon .................. | H04L 12/5601 709/240 |
| 6,081,907 A * | 6/2000 | Witty .................... | H04L 1/0041 714/752 |
| 6,195,026 B1 * | 2/2001 | Acharya | |
| 7,343,515 B1 * | 3/2008 | Gilbertson .......... | G06F 11/0724 714/10 |
| 2002/0172164 A1 * | 11/2002 | Chou ........................ | H04L 9/40 370/429 |
| 2003/0023710 A1 * | 1/2003 | Corlett ................ | H04L 41/0213 709/223 |
| 2003/0126409 A1 * | 7/2003 | Juan ....................... | G06F 9/3838 712/216 |
| 2003/0195983 A1 * | 10/2003 | Krause .................... | H04L 47/28 709/238 |

(Continued)

OTHER PUBLICATIONS

Arm Limited, "AMBA® 5 CHI Architecture Specification" 2014, 2017-2021, (release dates Jun. 12, 2014-Aug. 16, 2021) 508 pages.

(Continued)

*Primary Examiner* — Paul R. Myers
(74) *Attorney, Agent, or Firm* — NIXON & VANDERHYE P.C.

(57) ABSTRACT

In response to determining circuitry determining that a portion of data to be sent to a recipient over an interconnect has a predetermined value, data sending circuitry performs data elision to: omit sending at least one data FLIT corresponding to the portion of data having the predetermined value; and send a data-elision-specifying FLIT specifying data-elision information indicating to the recipient that sending of the at least one data FLIT has been omitted and that the recipient can proceed assuming the portion of data has the predetermined value. The data-elision-specifying FLIT is a FLIT other than a write request FLIT for initiating a memory write transaction sequence. This helps to conserve data FLIT bandwidth for other data not having the predetermined value.

19 Claims, 12 Drawing Sheets

(56) References Cited

U.S. PATENT DOCUMENTS

| | | | | |
|---|---|---|---|---|
| 2005/0240829 | A1* | 10/2005 | Safford | G06F 11/165 |
| | | | | 714/E11.063 |
| 2007/0076701 | A1* | 4/2007 | Yamada | H04L 49/254 |
| | | | | 370/386 |
| 2007/0250752 | A1* | 10/2007 | Prosch | H03M 13/2707 |
| | | | | 714/752 |
| 2008/0243012 | A1* | 10/2008 | Fujihashi | H03M 7/4006 |
| | | | | 600/509 |
| 2009/0024783 | A1* | 1/2009 | Rhim | H04L 49/15 |
| | | | | 710/316 |
| 2009/0089852 | A1* | 4/2009 | Randolph | H04N 21/44209 |
| | | | | 725/131 |
| 2009/0313382 | A1* | 12/2009 | Bouazizi | H04N 21/6587 |
| | | | | 709/234 |
| 2011/0149075 | A1* | 6/2011 | Base | H04N 21/6375 |
| | | | | 370/389 |
| 2011/0243154 | A1* | 10/2011 | Flynn | H04L 1/0079 |
| | | | | 714/758 |
| 2012/0078994 | A1* | 3/2012 | Jackowski | H04L 47/19 |
| | | | | 709/202 |
| 2013/0301643 | A1* | 11/2013 | Soulie | G06F 13/4018 |
| | | | | 370/392 |
| 2014/0115420 | A1* | 4/2014 | Willey | G06F 13/4282 |
| | | | | 714/758 |
| 2015/0309650 | A1* | 10/2015 | Ahmed et al. | |
| 2015/0350082 | A1* | 12/2015 | Pawlowski | G06F 3/0679 |
| | | | | 370/412 |
| 2016/0037661 | A1 | 2/2016 | Kim et al. | |
| 2016/0182186 | A1* | 6/2016 | Adler | H04L 12/40045 |
| | | | | 714/776 |
| 2016/0269320 | A1 | 9/2016 | Uchibori | |
| 2016/0285776 | A1* | 9/2016 | Gaist | H04L 1/18 |
| 2017/0070430 | A1* | 3/2017 | Zhang | H04L 12/50 |
| 2018/0241507 | A1* | 8/2018 | Kohda | H04L 45/40 |
| 2020/0050570 | A1* | 2/2020 | Agarwal | H04L 12/2818 |
| 2020/0125518 | A1* | 4/2020 | Ringe | G06F 12/0817 |
| 2021/0013999 | A1* | 1/2021 | Choudhary | H04L 45/121 |
| 2022/0012140 | A1* | 1/2022 | Das Sharma | G06F 11/1471 |
| 2022/0179735 | A1* | 6/2022 | Brewer | G06F 13/1668 |

OTHER PUBLICATIONS

International Search Report and Written Opinion of the International Searching Authority for PCT/GB2022/053098 mailed Feb. 21, 2023, 16 pages.

N. Agarwal et al, "Selective GPU Caches to Eliminate CPU-GPU HW Cache Coherence" 2016 IEEE International Symposium on High Performance Computer Architecture (HPCA), Mar. 12, 2016, pp. 494-506.

* cited by examiner

NumZero in DAT FLIT 158 — NumZero[1:0]

| Data Width | Request Size | NumZero | Data FLITs transmitted |
|---|---|---|---|
| 512 | Any | 0 | 1 |
| 256 | 512 | 0 | 2 |
|  | <=256 | 1 | 1 |
| 128 | 512 | 0 | 4 |
|  |  | 1 | 3 |
|  |  | 2 | 2 |
|  |  | 3 | 1 |
|  | 256 | 0 | 2 |
|  |  | 1 | 1 |
|  | <=128 | 0 | 1 |

NumZero in RSP FLIT 166 — NumZero[2:0]

| Data Width | Request Size | NumZero[2:0] |
|---|---|---|
| 512 | Any | 1 |
| 256 | 512 | 2 |
|  | <=256 | 1 |
| 128 | 512 | 4 |
|  | 256 | 2 |
|  | <=128 | 1 |

FIG. 10

DATA ELISION

BACKGROUND

Technical Field

The present technique relates to the field of data transfer over an interconnect.

Technical Background

An interconnect may be used in a data processing system, such as a system-on-chip (SoC), to connect different components capable of sending and receiving data, the components including for example processing elements such as central processing units (CPUs) or graphics processing units (GPUs), Input/Output (I/O) devices, and memory storage. A requester (e.g. one of the processing elements) may request transfer of write data from the requester to a memory storage or transfer of read data from memory storage to the requester. As well as transfer of data to or from memory storage, read and write transactions can also be used to control operation of input/output (I/O) devices, hardware accelerators or other system components.

There may be a number of requesters competing for bandwidth on the interconnect, and so available bandwidth may affect the performance that can be achieved for requesters awaiting transfer of data on the interconnect. However, when considering power consumption and circuit area constraints, there may be a limit to the extent to which the maximum available data transmission bandwidth can be increased. If available bandwidth on the interconnect can be used more efficiently, this can improve the performance achievable for a given amount of power or circuit implementation cost.

SUMMARY

At least some examples of the present technique provide an apparatus comprising:
data sending circuitry to send data to a recipient over an interconnect; and
determining circuitry to determine whether a portion of data to be sent by the data sending circuitry has a predetermined value; in which:
in response to the determining circuitry determining that the portion of data has the predetermined value, the data sending circuitry is configured to perform data elision to:
omit sending at least one data FLIT corresponding to the portion of data having the predetermined value; and
send a data-elision-specifying FLIT specifying data-elision information indicating to the recipient that sending of the at least one data FLIT has been omitted and that the recipient can proceed assuming the portion of data has the predetermined value, where said data-elision-specifying FLIT is a FLIT other than a write request FLIT for initiating a memory write transaction sequence.

At least some examples of the present technique provide an apparatus comprising:
data receiving circuitry to receive data from a sender over an interconnect; and
data elision processing circuitry to detect receipt of a data-elision-specifying FLIT specifying data-elision information indicating that at least one data FLIT corresponding to a portion of data having a predetermined value has been omitted from being sent by the sender, and in response to detecting the receipt of the data-elision-specifying FLIT, to proceed assuming the portion of data has the predetermined value, where said data-elision-specifying FLIT is a FLIT other than a write request FLIT for initiating a memory write transaction sequence.

At least some examples of the present technique provide a non-transitory computer-readable medium storing computer-readable code for fabrication of either of the apparatuses mentioned above.

At least some examples of the present technique provide a method comprising:
determining whether a portion of data to be sent to a recipient over an interconnect has a predetermined value; and
in response to determining that the portion of data has the predetermined value, performing data elision to:
omit sending at least one data FLIT corresponding to the portion of data having the predetermined value; and
send a data-elision-specifying FLIT specifying data-elision information indicating to the recipient that sending of the at least one data FLIT has been omitted and that the recipient can proceed assuming the portion of data has the predetermined value, where said data-elision-specifying FLIT is a FLIT other than a write request FLIT for initiating a memory write transaction sequence.

Further aspects, features and advantages of the present technique will be apparent from the following description of examples, which is to be read in conjunction with the accompanying drawings.

BRIEF DESCRIPTION OF THE DRAWINGS

FIG. 10 illustrates an example of data-elision information indicating how many data FLITs are omitted in the data elision.

DESCRIPTION OF EXAMPLES

Figure 1:
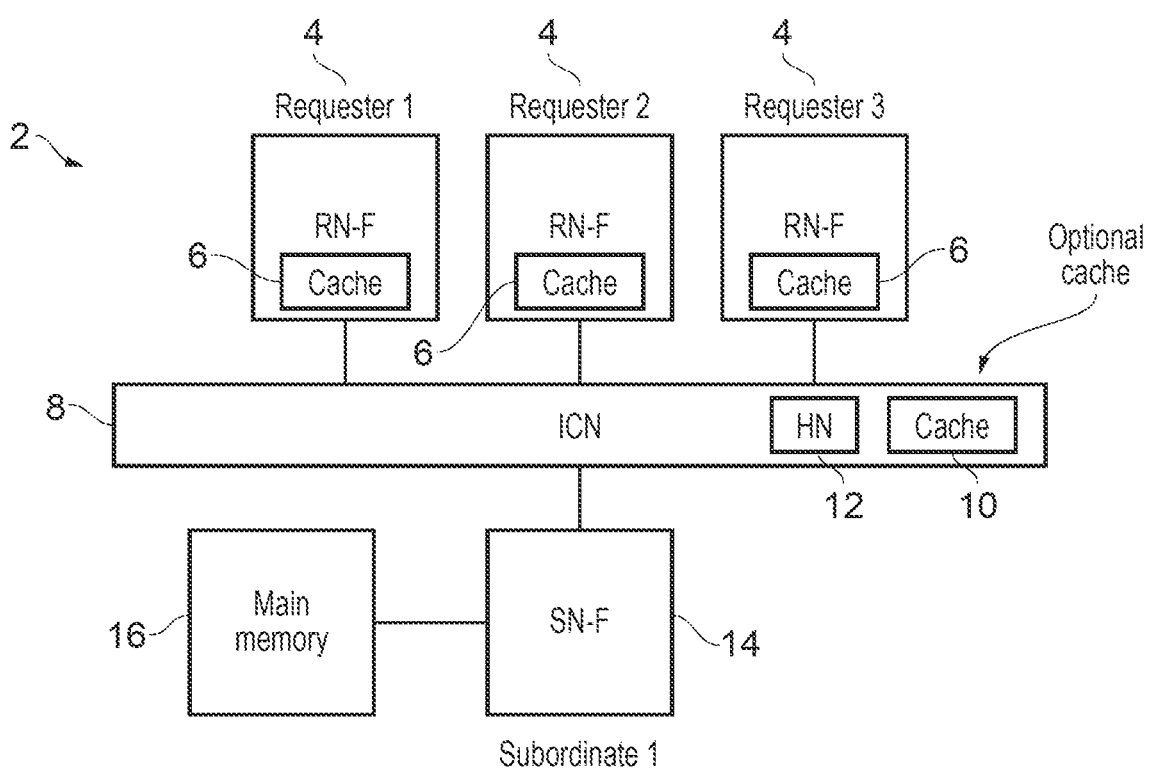
FIG. 1 illustrates an example of a data processing system.

An apparatus comprises data sending circuitry to send data to a recipient over an interconnect, and determining circuitry to determine whether a portion of data to be sent by the data sending circuitry has a predetermined value. In response to the determining circuitry determining that the portion of data has the predetermined value, the data sending circuitry is configured to perform data elision. The data elision comprises omitting sending at least one data FLIT corresponding to the portion of data having the predetermined value, and sending a data-elision-specifying FLIT specifying data-elision information indicating to the recipient that sending of the at least one data FLIT has been omitted and that the recipient can proceed assuming the portion of data has the predetermined value. The data-elision-specifying FLIT is a FLIT other than a write request FLIT for initiating a memory write transaction sequence.

The term "FLIT" is shorthand for "FLow control digiT" and refers to a basic unit of transfer on the interconnect. A given transaction may involve the exchange of a number of FLITs as part of the transaction flow. The term FLIT is typically capitalised by convention. The size of data FLITs can be variable as the interconnect protocol used by the interconnect may support communication links of the interconnect network having different data channel widths.

The inventors have recognised that in a data processing system it can be relatively common that a certain predetermined value of data is transmitted in a data FLIT, with the fraction of data FLITs transmitted containing data having the predetermined value being high enough that it can be justified to provide an interconnect protocol which supports the ability to signal, using data-elision information included in a data-elision-specifying FLIT, that at least one data FLIT has been omitted from being sent because the portion of data that would otherwise have been transmitted using that data FLIT had the predetermined value. By omitting sending at least one data FLIT, this reduces the overall number of data FLITs to be transmitted, and since the data-elision information can typically be specified using fewer bits than the omitted data FLIT itself, the overall number of bits transmitted including the data-elision-specifying FLIT may be reduced. This conserves data transmission bandwidth for other data FLITs which are to transmit data not having the predetermined value. Therefore, this approach can enable more efficient usage of the available transmission bandwidth on the interconnect, hence improving system performance for a given amount of power and circuit area cost.

The data-elision-specifying FLIT is a FLIT other than a write request FLIT. The write request FLIT is a type of FLIT used to initiate a memory write transaction sequence. An alternative approach for signalling that data having a predetermined value is to be transmitted could be to use a write request FLIT to initiate a write transaction requesting transfer of a certain amount of write data from the requester to a recipient, with the write request FLIT including information indicating which portion of the write data, if any, has the predetermined value so that it is not necessary to explicitly transmit a data FLIT for that portion of the write data. However, a problem with using the write request FLIT to signal data elision is that this is only available for the requester who initiates a write transaction on the interconnect, so is not available for senders of read data or snoop data where the sender of the transmitted data is not the requester that initiates the transaction. Also, even for write transactions, in many implementations the write request FLIT may, for performance reasons, be transmitted before the write data is available yet at the requester, so that the interconnect or a recipient of the write request FLIT can start preparing for the write operation (e.g. by issuing snoop requests for coherency purposes, or reserving space in buffers for the write transaction) even if the write data is still being obtained by the requester. Hence, if the write request FLIT were to be used to signal data elision, in practice this may limit use of data elision to cases where the operation which triggered the write request is pre-ordained to be an operation which will never cause any write data other than data having the predetermined value to be transferred, such as a write transaction performed to overwrite memory system locations corresponding to a newly allocated region of memory address space with a predetermined value. In practice, such operations may be a small fraction of the total number of write transactions, so many write transactions may not be able to benefit from data elision if signalling of the data elision is via the write request FLIT (e.g. for cache writebacks, the original purpose of the data stored in the cache may no longer be known so it cannot be known in advance that the data will definitely have the predetermined value). In cases where the write request FLIT is initiating a write transaction to transfer write data whose value can vary, then it may not be possible to use the write request FLIT to signal data elision because at the time the write request FLIT is sent the write data may not be available yet to check whether it has the predetermined value.

In contrast, in the approach discussed below, the data-elision-specifying FLIT is a FLIT other than the write request FLIT, which makes it practical to use data elision much more frequently to provide greater savings in data transmission bandwidth. For example, this may make it practical for a device sending read data or snooped data in response to a transaction initiated by another requester to use data elision for the return of the read or snooped data, or for a requester initiating a write transaction to use data elision even if at the time of issuing the write request FLIT it is not yet known whether the write data would have the predetermined value.

The predetermined value, which is implicitly determined by the recipient as being the value of omitted portions of data for which data elision has been used, can be any value. It can be useful to select, as the predetermined value, a data value for which it is estimated there will be a reasonable probability of data FLITs having the predetermined value. For example, there may be certain symbol values which are more commonly sent than other values, which could be represented as the predetermined value.

However, it can be particularly useful for the predetermined value to be zero. It has been observed from simulations of data traffic in typical use cases that a non-negligible fraction of data FLITs may turn out to be zero. For example in some simulations almost 10% of all data FLITs transmitted represented a data value of zero. This may be the case for a number of reasons. For example, when regions of address space are newly allocated, it can be reasonably common for the old contents of the corresponding memory system locations to be overwritten with 0. Cache writeback operations and memory paging operations may frequently shift data around between different storage locations (e.g. between faster to access and slower to access storage locations). Often, some of the data being transferred may be data that has never been updated since it was first initialised to 0. For example, to reduce the chance of overflow of a data structure such a stack or a buffer, a region of address space sufficient to handle worst case capacity may be allocated, but often the stack or buffer may not get close to the maximum capacity allocated and so there may be portions of data entirely filled with 0s stored in memory. Similarly, in an application processing strings representing text data, a string variable may be defined with a certain maximum number of characters, but it may be rare that the string actually requires the maximum number of characters, and so often there may be a large number of zeros towards the end of the region of memory allocated to represent the string. Hence, when such data gets written back from a cache or transferred to slower to access memory storage, a surprisingly large fraction of transfers may merely be moving zeroes between different storage locations. By providing an interconnect protocol which supports the ability to signal, in a FLIT other than write request FLIT, data-elision information specifying that data elision has been used to avoid the need to explicitly transfer a portion of data representing zero, this can conserve data transmission bandwidth and hence leave more bandwidth available for transfer of non-zero data.

In some examples, the interconnect protocol may support only a single predetermined value that can be signalled as elided using the data-elision information. For example, the protocol may only support use of data elision for transfers of data representing zero.

Other examples may support use of data elision for two or more different predetermined values, so that if the data to be sent has any of those predetermined values then the data elision can be used. In this case, the data-elision information may specify which of the two or more supported predetermined values is represented by the elided data which would otherwise have been transmitted in an omitted data FLIT.

The data elision can be used in a number of different scenarios when data is to be sent by a sender to a recipient.

For example, the data sending circuitry may perform the data elision for data which, in the absence of the data elision, would be sent as a response to a read request FLIT or snoop request FLIT received from the interconnect. This is an example of a scenario which would not be possible if the data-elision-specifying FLIT was a write request FLIT, as the device returning the read data in response to a read request FLIT or snooped data in response to a snoop request FLIT would not be issuing the write request FLIT.

For example, the data sending circuitry may perform the data elision for write data which, in the absence of the data elision, would be sent in a subsequent FLIT after the write request FLIT of the memory write transaction sequence. In this case, it is possible for the determining circuitry to determine whether the portion of data has the predetermined value after the write request FLIT for the memory write transaction sequence has already been sent by the data sending circuitry, so that a data-elision-specifying FLIT sent at a subsequent part of the transaction flow for the write transaction after the write request FLIT can specify the data elision information indicating whether at least one data FLIT has been omitted. Hence, by using a data-elision-specifying FLIT other than the write request FLIT to signal the data elision this gives the freedom to defer the determination of whether the portion data has a predetermined value to later in the transaction flow than the point at which the write request FLIT is issued, therefore opening up opportunities to use data elision in cases where it is not preordained that the data will have the predetermined value or when the write data is not available at the time of sending the write request FLIT.

Some implementations may choose to implement the option of using data elision only for a subset of the scenarios described above (e.g. only for some, but not all, of the read data, write data and snooped data), while others may support use of data elision for all of these scenarios.

The particular type of FLIT used to signal the data elision information can vary depending on the implementation choice used and/or on the scenario in which data elision is to be used.

For example, the data-elision-specifying FLIT can be another data FLIT sent by the data sending circuitry to send another portion of data having a value other than the predetermined value. This can be useful if not all of the data to be sent for a particular transaction has the predetermined value, in which case there may still be a need to send at least one data FLIT. The data elision information can be included as ancillary information (metadata) in a data FLIT sent to transmit a portion of data not having the predetermined value, with the ancillary information indicating to the recipient that at least one other data FLIT was not sent corresponding to another portion of data that can be assumed to have the predetermined value.

The interconnect may have a number of communication channels for exchanging FLITs, including at least a data channel to send data FLITs; and a response channel to send response FLITs. There may also be other channels such as a request channel for sending request FLITs for initiating memory system transactions, and/or a snoop channel for sending snoop request FLITs for snooping cached data in a private cache. Response FLITs may be messages sent in response to an already initiated transaction which provide information other than the payload data for the transaction. For example, response FLITs may be used for acknowledgement messages, error messages, etc.

In one example, the data-elision-specifying FLIT is a response FLIT sent on the response channel. For example, an existing type of response FLIT may be expanded to specify data-elision information, or alternatively a new type of response FLIT may be defined to act as the data-elision-specifying FLIT. Typically the data FLITs may comprise a greater number of bits than the response FLITs. Hence, sending a data-elision-specifying FLIT as a response FLIT on the response channel can be more efficient than sending an additional data FLIT on the data channel to represent transfer of data representing the predetermined value. Even if this results in a greater number of response FLITs being sent than would otherwise be needed, in practice adding more circuit resource to increase the response channel bandwidth may be less costly to implement than increasing data channel bandwidth due to the smaller bit width of the response channel compared to the data channel, so for a given power/circuit area cost moving the signalling of data having the predetermined value from the data channel to the response channel approach can improve efficiency of bandwidth utilisation across the data channel and response channel as a whole.

Some implementations may only support one of these approaches for implementing the data-elision-specifying FLIT (e.g. either supporting the use of a data FLIT as the data-elision-specifying FLIT, or supporting the use of a response FLIT as the data-elision-specifying FLIT, but not both).

Other implementations may support both approaches with some transactions using one form of data-elision-specifying FLIT and other transactions using the other. For example, the determining circuitry may determine, depending on whether all data FLITs to be sent from the sender to the recipient for a given transaction correspond to data having the predetermined value, whether the data sending circuitry should send, as the data-elision-specifying FLIT, a data FLIT on the data channel or a response FLIT on the response channel. If at least one data FLIT to be sent for the given transaction is to transmit data having a value other than the predetermined value, the data-elision-specifying FLIT may be the data FLIT on the data channel (as that data FLIT is already being sent, it can be more efficient to use data-elision information specified in that data FLIT to signal the data elision, rather than cause an additional response FLIT to be sent). If all data FLITs to be sent from the sender to the recipient for the given transaction represent data having the predetermined value, the data-elision-specifying FLIT may be the response FLIT on the response channel (to avoid the data sending circuitry needing to send any data FLITs at all for that transaction).

Another scenario in which transfer of messaging from the data channel to the response channel can be useful can be sending a write cancel FLIT which indicates that, following sending of the write request FLIT to initiate a memory write transaction sequence, the memory write transaction sequence is to be cancelled. Write cancel FLITs can be useful to indicate to a recipient of the write request FLIT that it should no longer expect write data to be sent. Some interconnect protocols support sending such write cancel FLITs on the data channel. However, the inventors have recognised that the data channel bandwidth may be more scarce than the response channel bandwidth and the transmission of a data channel FLIT merely to indicate a write cancellation message may waste the bit width of the data channel which may be much wider than is necessary for sending a write cancellation message. Hence, it can be useful for the data sending circuitry to also support sending a response-channel write cancel FLIT on the response channel to indicate that, following sending of the write request FLIT to initiate a memory write transaction sequence, the memory write transaction sequence is to be cancelled. By providing an interconnect protocol that supports sending of response-channel write cancel FLITs, this can help conserve bandwidth on the data channel to improve overall performance. The data-channel write cancel FLIT can still be supported to enable backwards compatibility with components designed for versions of the protocol which only support data-channel write cancel FLITs.

The data-elision information can be represented in different ways. In general, the data-elision information provides information enabling the recipient to determine that data elision has been used, triggering the recipient to determine how many data FLITs would have been transmitted for a given transaction sequence had the data elision not been performed. This can allow the recipient to reconstruct the elided data represented by the data-elision information and determine when it should not expect any more data FLITs for a given transaction sequence.

In one example, the data-elision information may simply be an indication of the fact that data elision has been used for the corresponding transaction (without specifying a number of data FLITs that were omitted). For example, in a case where all the data for a given transaction has the predetermined value and so all data FLITs for that transaction can be omitted (with the data-elision-specifying FLIT being sent as a response-FLIT to avoid data channel usage, for example), then other information already available to the recipient may indicate the size of data to be transmitted in that transaction, so that the recipient can deduce the amount of data that is to be assumed to have the predetermined value (e.g. zero). For example, a size parameter may already have been specified in an earlier request FLIT issued by the requester for a read or write transaction, so in the case where the data FLITs for that transaction are omitted in their entirety, it is not necessary to signal the number of omitted flits explicitly in the data-elision-specifying FLIT.

For example, for at least one type of data-elision-specifying FLIT (e.g. the response-channel data-elision-specifying FLIT), the data-elision-specifying FLIT could have a FLIT opcode (denoting the type of FLIT being sent) that indicates that this FLIT is a data-elision-specifying FLIT and that all the data FLITs for the corresponding transaction were omitted through data elision.

In other examples, the data-elision information may be indicative of how many data FLITs are omitted in the data elision. This helps support cases where the data FLITs for a transaction are only partially omitted, and even in the case when all data FLITs for a transaction can be omitted, it can still be useful (optionally) to indicate a number of omitted FLITs in the data-elision-specifying FLIT to ease the implementation of circuitry at the recipient. By indicating the number of data FLITs as the number of omitted data FLITs (rather than the number of remaining FLITs to be transmitted after the data-elision-specifying FLIT, for example), this has the advantage that the data-elision information can have the same value regardless of the order of transmission or reception of any remaining non-omitted data FLITs sent for a given transaction.

It is not necessary to perform data elision for all cases when the data to be transmitted has the predetermined value. Sometimes, data elision can be disabled, for various reasons. When the data elision is disabled, in a case where a portion of data has the predetermined value, the data sending circuitry can send the at least one data FLIT corresponding to the portion of data to the recipient, despite the portion of data having the predetermined value.

For example, the data sending circuitry may disable the data elision when the recipient cannot support use of the data elision. Not all recipients may be able to reconstruct the data when some portions have been omitted from being sent due to data elision. For example, the system may include at least one legacy recipient designed for use with a legacy protocol which did not support data elision. The data sending circuitry could exchange signalling with the recipient to query whether the recipient is able to support use of data elision, and may disable the data elision if the recipient cannot support data elision.

Another example of a scenario when data elision may be disabled may be when a tag checking mode is enabled. Some systems may comprise tag checking circuitry to perform, when the tag checking mode is enabled, a tag checking operation to determine whether an address tag associated with a target address of a memory access request corresponds to an allocation tag stored in a memory system associated with a block of one or more addresses comprising the target address. Such tag checking can be useful for improving memory security, as discussed in more detail below. The tag check can be useful for detecting memory usage errors which cause certain memory access instructions to access a region of memory other than the one intended by the programmer or compiler. As the tag check compares an address tag associated with the target address of the memory access request (which will typically originate from the processing element initiating the memory access) with an allocation tag associated with the block of memory system locations corresponding to that address (the allocation tag will often be derived from data stored within the memory system), then depending on the location of the tag checking circuitry and/or on the type of memory access transaction being performed, either address tag values or allocation tag values may be transmitted via the interconnect for use in the tag checking operation. As often the tags may accompany corresponding data being transmitted, it can be useful for data FLITs on the interconnect to include a tag field for providing an associated allocation tag value or address tag value for the tag checking operation. Other kinds of FLIT supported by the interconnect protocol may not have such tag fields and it may not be considered efficient to expand the FLIT format of non-data-channel FLITs to accommodate the tag value. Hence, when the tag checking mode is enabled, then even if a portion of data to be sent via the interconnect has the predetermined value, it may still be desired to send at least one tag value alongside the data and so it may be preferable to send the data FLIT providing the data having the predetermined value, despite the data having the predetermined value, simply to enable distribution of the address tag value or allocation tag value. This can be simpler than providing other mechanisms for transmitting tag values via non-data-channel FLITs. Therefore, in an approach supporting a tag checking mode, the data sending circuitry can disable the data elision when the tag checking mode is enabled.

Another field which can be supported within a data FLIT is a poison field to indicate whether at least part of data sent in the data FLIT is corrupted. Stored data may become corrupted due to randomly occurring errors such as bit flips caused by alpha particle strikes. Such corruption may be detected, for example using error detecting codes. The poison field transmitted as part of the data FLIT may be used to signal to a recipient that part of the data to be sent has become corrupted. FLITs other than data FLITs may not have a poison field and the likelihood of data becoming corrupted may be sufficiently low that it is not worth adding a poison field to non-data FLITs merely to support data elision for the corrupted data. Therefore, in some scenarios it may be preferred to disable data elision when at least part of the portion of data to be sent is corrupted.

The determination of whether a portion of data to be sent has the predetermined value can be performed in different ways. In one example the determining circuitry may actually analyse bits of the portion of data to be sent, to determine whether the portion of data has a predetermined value. For example a comparison operation can be performed to compare the portion of data with the predetermined value, or a set of Boolean logical operations can be used to determine whether the portion of data has the predetermined value (e.g. if the predetermined value is 0, checking whether all bits of the data are zero by performing an AND reduction of each bit of the data portion to produce a single output bit of 1 when any bit of the data portion is 1 or an output bit of 0 when all bits are 0).

Alternatively, when the portion of data to be sent is obtained from a cache, the determining circuitry may determine whether the portion of data has the predetermined value based on cached metadata associated with the cached data, the cached metadata indicative of whether the portion of cached data has the predetermined value. For example, the cached metadata could be allocated alongside other tag information stored in association with cached data. At the time of updating cached data in the cache, the cached metadata may be calculated to indicate whether the updated value of the cached data has the predetermined value. In some examples, the cached metadata may distinguish, on a portion by portion basis, which portions of a cache line of cached data have the predetermined value.

With this approach, this means that at the time of sending the cached data over the interconnect, it is not necessary to analyse bits of the cached data itself, and instead the cached metadata can be used to determine whether a portion of data to be sent to the recipient has the predetermined value. This can improve performance because in cases when the same cached data is transmitted over the interconnect more than once, the overhead of determining whether the cached data has the predetermined value can be shared across multiple data transmissions, rather than being incurred on each instance of transmitting the data. Also, this means the latency of analysing the bits of the cached data is removed from the critical timing path associated with the transaction flow of sending the data over the interconnect, as it may already have been done earlier before the data was requested to be sent.

In a corresponding way to the apparatus described above, an apparatus may comprise data receiving circuitry to receive data from a sender over an interconnect; and data elision processing circuitry to detect receipt of a data-elision-specifying FLIT specifying data-elision information indicating that at least one data FLIT corresponding to a portion of data having a predetermined value has been omitted from being sent by the sender, and in response to detecting the receipt of the data-elision-specifying FLIT, to proceed assuming the portion of data has the predetermined value. The data-elision-specifying FLIT is a FLIT other than a write request FLIT for initiating a memory write transaction sequence. Hence, the receiver of the data-elision-specifying FLIT can proceed with the operations that would have been performed had the portion of data having the predetermined value actually been sent by the sender. For example, the data elision processing circuitry may reconstruct, at the receiving side, the predetermined value of that portion of data based on the data-elision information, without that portion of data actually having been sent by the sender.

Communication over the interconnect may be performed according to an interconnect protocol which may define rules for the transaction flows for various types of transactions. By agreeing a common interconnect protocol this enables devices which are compatible with the protocol to easily be combined together into a processing system, even if designed by different parties.

For example, the interconnect protocol may be an on-chip communication protocol intended for on-chip communication within a system-on-chip. It may also be possible to use the same on-chip communication protocol for chip-to-chip links between different integrated circuits within a processing system.

For example, the interconnect protocol may be a memory system interconnect protocol intended for use in a data processing system to handle read/write transactions initiated by a processing element such as a Central Processing Unit (CPU) or Graphics Processing Unit (GPU) to request read or write access to a memory system. The read/write transactions can also be used by the processing elements to control input/output devices (peripheral devices).

The interconnect protocol may be a cache-coherent protocol which supports maintaining coherency of data cached by one or more caches. For example, the interconnect protocol may support transmission of snoop FLITs for querying coherency status of cached data and/or triggering invalidations or writebacks of cached data when required for maintaining cache coherency.

Specific examples are discussed below. It will be appreciated that the claimed subject-matter is not limited to these particular examples.

FIG. 1 illustrates an example of a data processing system 2, for example an integrated circuit or system-on-chip (SoC). The system 2 may comprise at least one processor and memory storage. The system includes a number of requesters 4, also referred to as requesting nodes (RN), capable of issuing requests to initiate memory system transactions, such as read transactions for reading data from memory storage or write transactions for writing data to the memory storage. For example, the requesters 4 may include one or more central processing units (CPUs), one or more graphics processing units (GPUs), and/or one or more neural processing units (NPUs—specialised hardware processing units designed to handle neural network processing). In the example shown in FIG. 1 each requester 4 has a cache 6 for caching data from the memory system. It is also possible to include one or more further requesters 4 which do not have a cache 6. For example the requesters not having a cache 6 could include an I/O (Input/Output) controller for controlling input and output of data for an I/O device.

An interconnect 8 is used to connect the requesters 4 together and to control access to one or more subordinate nodes (SN) 14 which respond to transactions initiated by the requesters. For example, a subordinate node 14 may include a memory controller for controlling access to memory storage 16. While FIG. 1 shows only a single subordinate node for conciseness, it will be appreciated that the system may include two or more SNs, for example memory controllers for controlling access to respective memory storage devices, or peripheral controllers for controlling peripheral devices. A system cache 10 may be provided coupled to the interconnect 8 but shared between requesters (in contrast to the private caches 6 which are assigned to a particular requester device 4). The system cache 10 may be provided to speed up access to data by uncached requesters, or for allowing faster access (compared to accesses to main memory 16) to data that cannot be accommodated in the private caches 6 of the requesters 4.

An interconnect protocol is used to define the rules for exchanging communications between the requesting nodes 4, interconnect 8 and subordinate nodes 14. For example, the protocol can define the format of messages exchanged by the various nodes 4, 8, 14 and the sequences of messages to be used for certain types of transaction. The interconnect protocol may be an on-chip protocol designed for on-chip communications between processing elements and the memory system, although the protocol could also be used for off-chip communications from the system on chip to external devices. The protocol may be a coherent protocol which supports measures for maintaining coherency between data cached in respective caches 6 of the various requesters 4. The interconnect 8 may include a home node (HN) 12 which is responsible for managing the coherency of cached data in caches 6, 10. For example, when one requester 4 issues a read or write transaction to data which could be shared with other requesters, the home node 12 may cause snoop transactions to be issued to other requesters 4 which could have a cached copy of the data from the same address, manage changes in coherency state at those other requesters (e.g. triggering cleaning or invalidation of cached data at the other requesters 4 if necessary) and/or respond to the requesting requester 4 with a more up to date version of the requested data, as necessary. Optionally a snoop filter (not explicitly shown in FIG. 1 but which could be implemented either as a combined structure with the system cache 10 or as a separate structure) can be used by the home node 12 to track which data addresses are cached at certain requester devices 4 so that snoop traffic can be reduced by allowing the home node 12 to avoid sending a snoop request to a requester 4 determined not to hold the cached data.

Examples of interconnect protocols which could be used by the interconnect 8 are the AMBA® 4 ACE or AMBA® 5 CHI coherency protocols provided by ARM® Ltd of Cambridge, UK, but it will be appreciated that the data elision technique discussed here could also be applied to other interconnect protocols.

FIG. 1 shows the interconnect 8 in a generic form as a single unit linking the various requesters 4 and subordinate nodes 14, but it will be appreciated that the interconnections between the various requesters 4, home node 12 and subordinate nodes 14 can be implemented in a number of different ways in terms of the physical routing of communications across the chip. For example, the interconnect 8 could be implemented as a crossbar switch including a number of point-to-point connections between various pairs of nodes, as a ring interconnect where nodes 4, 12, 14 are connected to different points around a ring bus and messages circulate around the ring bus from their source to the destination, or a mesh network where a grid of connections is provided between the nodes 4, 12, 14 and so messages can travel from one node to another via more than one route across the grid. Hence, the techniques discussed below may be independent of the particular network topology used to implement the interconnect 8. Also, while FIG. 1 shows a single unit for the interconnect 8, in some implementations this may be split into a number of different sub-interconnects 8 each connecting a subset of the nodes of the system 2. For example, a coherent interconnect could be used to connect the requesters 4 and the home node 12, and a separate system interconnect may be used to connect the coherent interconnect to the subordinate nodes 14, so that the system interconnect need not implement the coherency supporting features of the interconnect protocol such as snoop channels.

Figure 2:
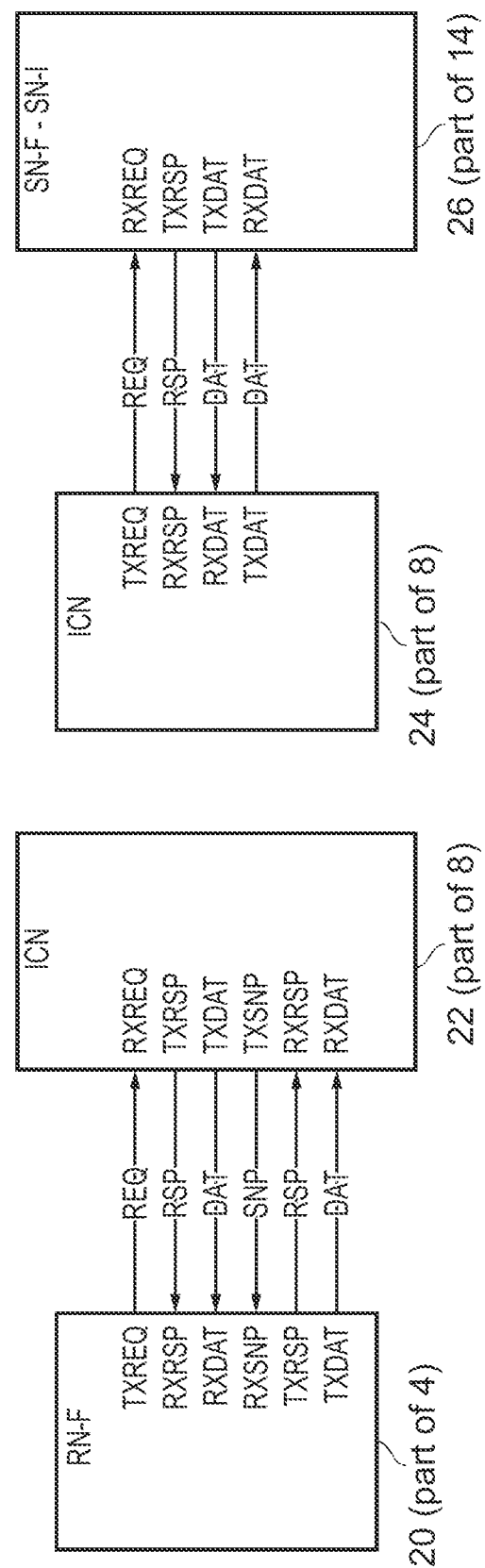
FIG. 2 illustrates an example of channels for transferring FLITs via the interconnect.

FIG. 2 illustrates an example of communication channels between a requesting node (RN) 4 and the interconnect 8 and between the interconnect 8 and a subordinate node (SN) 14.

The RN 4 has a message interface 20 which is responsible for managing sending and receiving of messages via the communication channels, and the interconnect 8 has a corresponding requester message interface 22 for managing receipt and sending of messages from and to the RN 4. The link between the requester's message interface 20 and the interconnect's requester message interface 22 includes a number of communication channels including:

- a request channel REQ for sending request FLITs (FLow control digits—a FLIT is the basic unit of communication in the interconnect protocol) from the RN 4 to the interconnect 8. The request FLITs are for initiating a new transaction flow, such as a new read or write transaction.
- a data channel DAT including a first data path for sending write or snoop data from the RN 4 to the interconnect 8 and a second data path for sending read data from the interconnects 8 to the RN 4. Data FLITs providing payload data, such as read, write or snoop data, can be sent in both directions via the data channel DAT.
- a response channel RSP including a first response path for sending response FLITs from the RN 4 to the interconnect 8 and a second response path for sending response FLITs from the interconnect 8 to the RN 4. The response FLITs may be used to communicate messages other than payload data, such as (for the second response path) write acknowledgement messages confirming that a write request has been serviced, or (for the first response path) snoop response messages indicating coherency status of a snooped address in the RN's cache 6. It will be appreciated that these are just some examples of types of response FLITs that may be exchanged.

a snoop channel SNP used by the interconnect 8 to send a snoop FLIT to the RN 4 to query coherency status of a snoop target address in the RN's cache 6 or to trigger changes in coherency state at the RN's cache 6, such as a requesting an invalidation or cleaning operation. For requesters 4 such as an I/O controller that do not have a private cache 6, the snoop channel SNP could be omitted. Alternatively, some I/O agents may still have a snoop channel SNP for memory management unit coherency even if they do not have a coherent cache 6.

The interconnect 8 also has a subordinate node message interface 24 for managing exchange of messages with a SN 14, and the SN 14 has a corresponding message interface 26 for managing exchange of messages with the interconnect. Similar to the link between the RN 4 and the interconnect 8, the link between the interconnect 8 and the SN 14 may include the request channel REQ, data channel DAT and response channel RSP, but the response channel RSP may be a unidirectional channel sending response FLITs from the SN 14 to the interconnect 8 as there may be no need for sending response FLITs in the opposite direction. Also, there is no need for a snoop channel SNP on the link between the interconnect 8 and SN 14.

It will be appreciated that FIG. 2 shows just one example of possible channel definitions provided in the links between the interconnect 8 and the RN 4 and SN 14 respectively, and even within a protocol supporting these channel definitions the protocol may also support other interface types which have a different arrangement of channels, so it is not essential for every component of the system to use the same channel definition.

Typically, the data channel DAT may have wider bit width than the other channels as the data payload may be large in comparison to the information carried by other types of FLITs. The width of the data channel DAT may vary for different links within the same system. For example, some components may communicate with a narrower data channel while other components may use a wider data channel, and so the system may include components for converting between the different data widths used in different parts of the system, for example by splitting a larger FLIT received from an upstream node of the system into a number of smaller FLITs to be issued to a downstream node or combining a number of smaller FLITs received from the upstream node into a larger FLIT to be issued downstream. Hence, the particular number of data FLITs sent for a given transaction may vary. Nevertheless, it is common that the number of bits in a data FLIT may be significantly greater than the number of bits in other types of FLIT. For example, in one particular example, the data channel may include of the order of several hundreds of bits per FLITs (e.g. 300-400 bits, including the data payload and any accompanying metadata) while the FLITs on the response channel for example may only require in the order of 50-80 bits depending on implementation.

System performance may be limited based on the amount of bandwidth available for exchanging FLITs within the interconnect. As the data channel DAT is often so much wider than other channels, increasing data channel bandwidth is typically much more expensive in terms of circuit area and power cost compared to increasing bandwidth in other channels, so it is likely that the available data channel bandwidth will be the limiting factor on performance, more than available bandwidth on other channels. If communication of data FLITs is delayed due to insufficient data channel bandwidth, this may cause processing operations performed at a RN 4 to be delayed while waiting for the data, so that a noticeable performance hit is seen by the user of the system. This means that the ability to efficiently use any available data channel bandwidth that is provided may be a significant factor in terms of the system performance that can be achieved for a given amount of power and circuit area cost.

Figure 3:
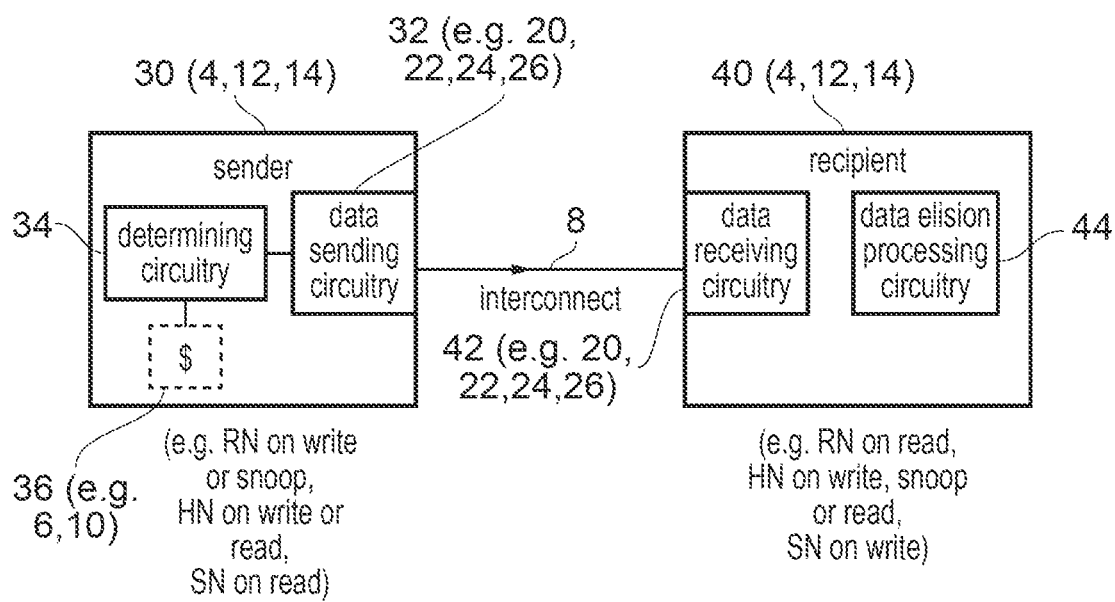
FIG. 3 illustrates an example of a sender sending data to a recipient via the interconnect.

FIG. 3 shows an example of a sender 30 and a recipient 40 within the data processing system 2 of FIG. 1. The sender 30 is a node of the system which is to send data via the data channel DAT and the recipient 40 is a node which is to receive the data sent by the sender 30. Different nodes of the system can act as the sender 30 and the recipient 40 for different types of transaction flows. For example, for a write transaction the sender 30 could be the RN 4 and the recipient 40 could be the HN 12, or the sender 30 could be the HN 12 and the recipient 40 could be an SN 14. For a read transaction the sender could be the SN 14 and the recipient 40 could be the HN 12, or the sender could be the HN 12 and the recipient could be the RN 4. For snoop responses which send data via the data channel DAT, the sender could be an RN 4 other than the requesting RN 4 which requested the read/write transaction which caused the snoop request to be issued, and the recipient 40 could be the HN (or in a system which supports direct forwarding of snooped data from one RN 4 to another 4 without going via the HN 12, the recipient 40 could be the requesting HN 4). Hence, in the examples discussed below the sender 30 and recipient 40 can be seen as any pair of nodes of the system for which the sender 30 is to send data to the recipient 40 via the data channel. The techniques for data elision discussed below can be applied at a range of different nodes of the system.

The sender 30 includes data sending circuitry 32 which for example can be one of the message interfaces 20, 22, 24, 26 shown in FIG. 2, depending on which node is acting as the sender 30 for the particular message flow when data elision is to be used. The sender 30 also includes determining circuitry 34 for determining whether a portion of data to be sent has a predetermined value allowing data elision to be used. When data elision is used, instead of actually sending the portion of data having the predetermined value, a data-elision-specifying FLIT is sent to the recipient to signal that the data was elided and that the recipient 40 can assume that the data not sent had the predetermined value.

Optionally, the sender 30 may include a cache 36, which in the case where the sender is the RN 4 could be the private cache 6 of the RN 4, and in the case where the sender 30 is the HN 12 could be the system cache 10. If the sender 30 is the SN 14 then there may be no cache 36.

The recipient 40 includes data receiving circuitry 42 which, for example, can be one of the message interfaces 20, 22, 24, 26 shown in FIG. 2, depending on which node is acting as the recipient 40 for the particular message flow when data elision is to be used. The recipient 40 also includes data elision processing circuitry 44 for processing the data-elision-specifying FLIT sent by the sender 30 and using the information in that FLIT to deduce that elided data was not sent by the sender 30 and can be assumed to have the predetermined value.

Figure 4:
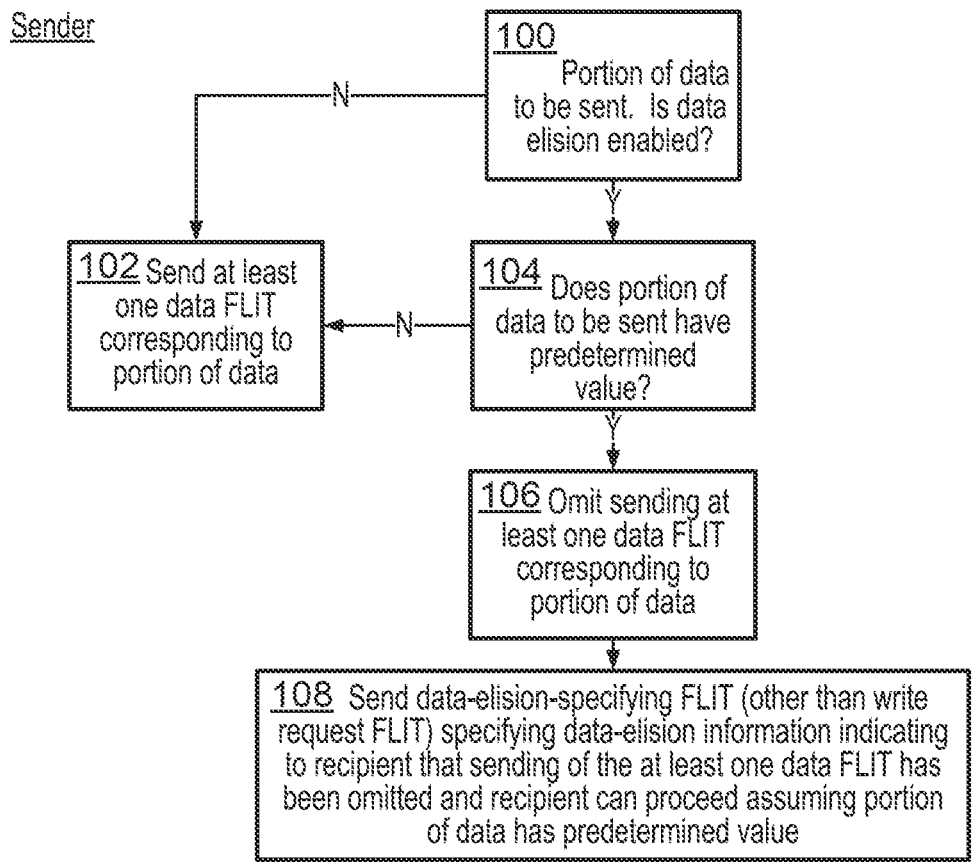
FIG. 4 is a flow diagram showing data elision performed at the sender.

FIG. 4 illustrates a method performed at the sender 30 to support data elision. At step 100 a portion of data is to be sent via the data channel DAT from the sender 30 to the recipient 40. The determining circuitry 34 determines whether data elision is currently enabled and if not then at step 102 at least one data FLIT is sent to convey the portion of data to the recipient 40. When data elision is disabled (e.g. because the recipient 40 does not support data elision or for other reasons as discussed further below), a given data FLIT is sent even if it conveys data having the predetermined value.

If data elision is enabled then at step 104 the determining circuitry 34 determines whether the portion of data to be sent has the predetermined value. For example, the predetermined value can be zero. If the data does not have the predetermined value, then again at step 102 at least one data FLIT is sent to the recipient 40 to convey the portion of data.

If data elision is enabled and the portion of data to be sent has the predetermined value, then at step 106 at least one data FLIT corresponding to the portion of data having the predetermined value can be omitted from being sent to the recipient 40 via the interconnect 8. At step 108 the data sending circuitry 32 sends a data-elision-specifying FLIT, other than a write request FLIT, to the recipient 40. The data-elision-specifying FLIT specifies data-elision information indicating to the recipient 40 that sending of at least one data FLIT has been omitted and that the recipient 40 can proceed assuming the portion of data that would have been sent in the omitted data FLIT has the predetermined value.

Figure 5:
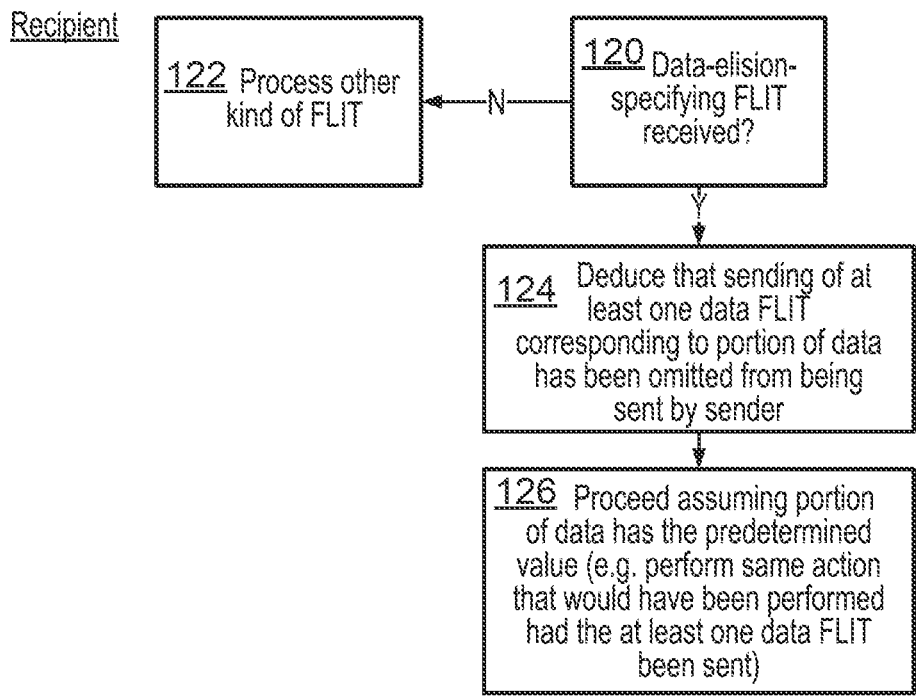
FIG. 5 is a flow diagram showing a response to a data-elision-specifying FLIT by the recipient.

FIG. 5 illustrates a method performed at the recipient 40 when the recipient supports data elision. At step 120, the data elision processing circuitry determines whether a data-elision-specifying FLIT has been received at the data receiving circuitry 42. If not, then at step 122 the recipient 40 processes another kind of FLIT received via the interconnect. If the data-elision-specifying FLIT is received then at step 124 the data elision processing circuitry 42 deduces that sending of at least one data FLIT corresponding to a portion of data having the predetermined value has been omitted from being sent by the sender 30. At step 126 the data elision processing circuitry 42 controls the recipient 40 to proceed assuming the portion of data represented by the omitted data FLIT has a predetermined value. For example, the recipient 40 may perform the same action that would have been performed if the omitted data FLIT (or data FLITs) had actually been sent.

The data-elision-specifying FLIT in the example of FIGS. 4 and 5 could, for example, be a response FLIT sent on the response channel RSP or another data FLIT being sent to convey data not having the predetermined value. Either way, omitting the data FLIT corresponding to the portion of data having the predetermined value and instead sending a data-elision-specifying FLIT enables data channel usage to be eliminated for FLITs which contain data having the predetermined value, such as 0. This is particularly useful where the predetermined value is 0 because it has been found by simulation of typical data traffic flows that, for one study, 7.8% of all cacheable read and write transactions convey data for which all data FLITs of the transaction are all 0s, while 9.3% of all 256-bit data FLITS in that simulation were found to contain data having all 0s (this includes the data FLITS from the 7.8% of transactions providing data that is all 0s, and also additional FLITs of transactions where only part of the data is all 0s and other data FLITs in the same transaction provide non-zero data). Hence, almost 10% additional data channel bandwidth can be recovered for use by other data FLITs providing non-zero data, enabling a significant performance increase. Clearly, the particular saving in data channel bandwidth that can be achieved will depend on the system design and on which software applications are being executed, but this illustrates that it is feasible that a significant amount of bandwidth can be conserved by using data elision.

This approach exploits the fact that it can be common for large quantities of zeros to be moved around in the memory system during cache writeback or linefill operations or memory paging operations when a certain region of the address space has been defined to handle maximum capacity requirements for a particular data structure or string variable for example, but the data written to that allocated region has not fully occupied the allocated capacity and so remaining capacity may still be filled with zeros that were initialised in the allocated region when the region of address space was first allocated. Often, when performing cache writeback/linefill or memory paging operations it will not be possible to know in advance whether the data will contain only zeros before the point at which the data is read from a cache or a memory storage device, so signalling the data-elision information in a request FLIT issued by an RN 4 may not be capable of enabling data elision to be performed for such cache writeback/linefill or memory paging operations where it is not preordained that the data will definitely contain only zeros. Hence, using a data-elision-specifying FLIT other than a write request FLIT sent on the request channel REQ can greatly increase the number of occasions when data elision is possible for various pairs of nodes within the data processing system, freeing up much greater data channel bandwidth.

Figure 6:
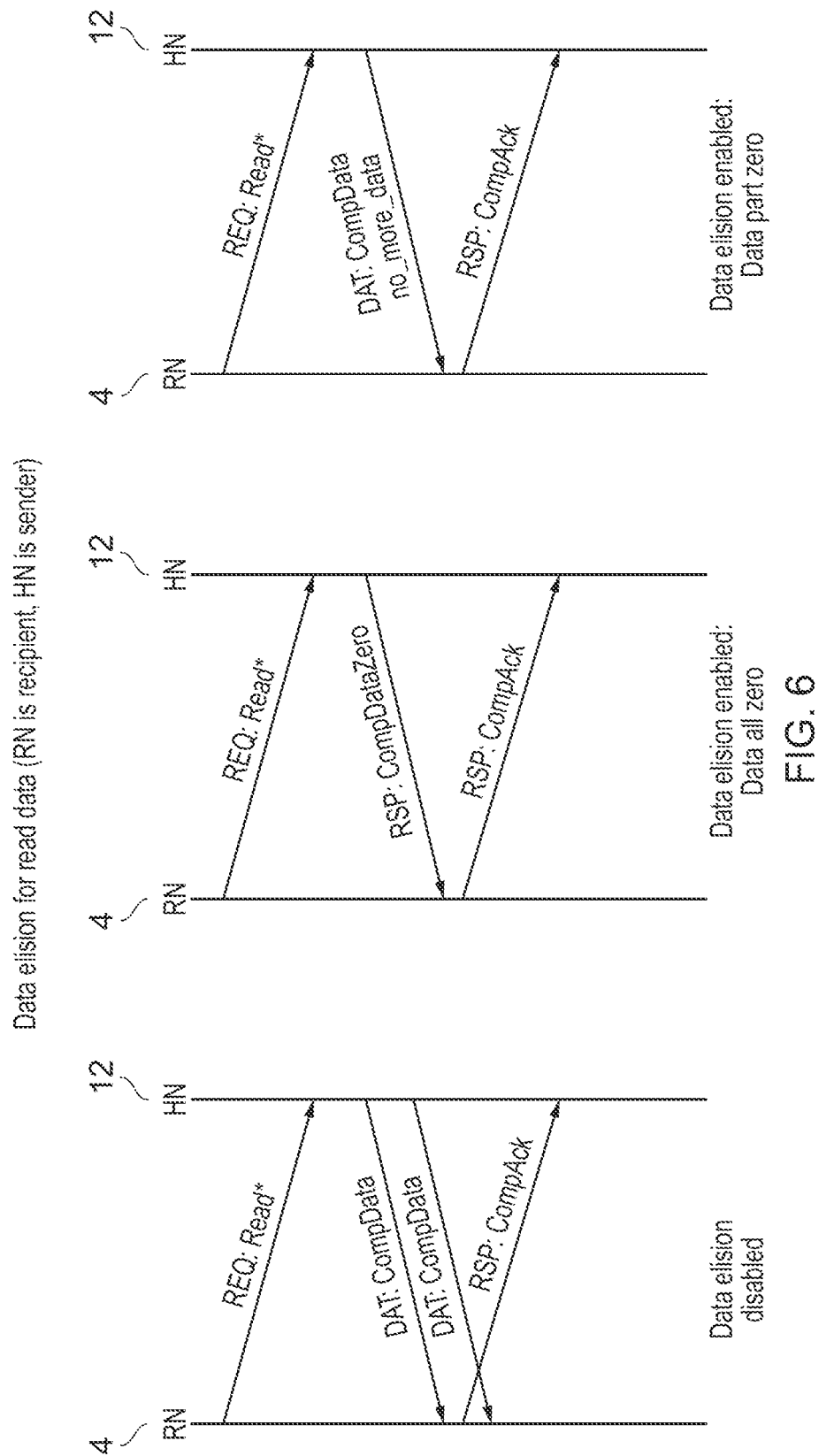
FIG. 6 illustrates use of data elision for read data in a read transaction.

FIG. 6 shows an example of using data elision for the read data sent from the HN 12 to the RN 4 during a read transaction flow. In this case, the HN 12 is acting as the sender 30 and the RN 4 acting as recipient 40. The left-hand part of FIG. 6 shows a ladder diagram illustrating the transaction flow in the case where data elision is disabled. A request FLIT is sent from RN 4 to HN 12 on the request channel REQ. In response, the HN 12 locates the requested data (either by obtaining the data from the system cache 10, or by obtaining the data from a snooped RN 4, or by issuing a read request FLIT to an SN 12 which is associated with the memory storage device storing the data and receiving the data from the SN 12). Once the data has been obtained then the HN 12 issues a number of data FLITs to the RN 4 over the data channel DAT. In response the RN 4 replies with a response FLIT on the response channel RSP to acknowledge receipt of the data. The example of FIG. 6 shows a case where two data channel FLITs are sent for the read transaction. However, the particular number of data FLITs required for a given transaction may depend on the size of the data requested to be transmitted in the transaction and the width of the data channel implemented for the link between the RN 4 and the HN 12. For example, other examples could use a single data FLIT or could use more than two data FLITs.

The middle ladder diagram in FIG. 6 illustrates a flow which can be used when data elision is enabled and all the data to be sent in from HN 12 to RN 4 in the read transaction is zero, so that there is no need to send any data FLITs at all from the HN 12 to the RN 4. In this case, the HN 12 sends, as the data-elision-specifying FLIT, a response channel FLIT (CompDataZero) on the response channel RSP which includes data-elision information indicating that no data FLITs are being sent because all the data required was zero. For example, the opcode of the response channel FLIT can indicate an opcode value which indicates that this is a data-elision-specifying FLIT, enabling the recipient to deduce (e.g. from size information sent earlier in the read request FLIT) the amount of data to be set to zero. Optionally, an additional field included in the response FLIT format may be used to signify the number of data FLITs that were elided, which can make it simpler in some implementations for the RN 4 to determine how many FLITs of data are to be deduced as having the zero value.

On the other hand, the right-hand ladder diagram in FIG. 6 illustrates a flow which can be used when data elision is enabled and only part of the data to be sent in the read transaction is zero, so that at least one data channel FLIT still has to be sent. In this case, the data channel FLIT (Comp-Data) that is sent for the non-zero data may include a field which provides the data-elision information (no_more_data) indicating that at least one other data FLIT was not sent, to reduce the number of data FLITs needed to be sent in total for the read transaction. While it would be possible to use a "no_more_data" flag (indicating when the last FLIT has been sent) as the data-elision information, as explained further below a NumZero field 158 can also be used to indicate the number of omitted data FLITs that were not sent due to data elision (in the example of FIG. 6 the NumZero field would indicate that 1 of the 2 data FLITs expected were omitted).

Either way, the RN 4 can deduce from the data-elision information of the data FLIT (acting as a data-elision-specifying FLIT) the number of data FLITs that were omitted from being sent and hence can reconstruct the overall data being read to include the portion that contains all bits having a value of 0.

Hence, whether the data elision is signalled using a FLIT on the data channel DAT or the response channel RSP may be determined by the determining circuitry 34 of the sender 30 depending on whether the data to be sent is all zero or only partially zero, but in either case when at least one data FLIT would contain only zeros then bandwidth on the data channel can be reduced by using data elision.

FIG. 6 shows an example of a scenario where the sender of the data is not the RN 4 that initiated the transaction by issuing the request FLIT on the request channel REQ, so illustrates a scenario where signalling data-elision information using a request FLIT would not be capable of supporting data elision. Instead, a data-elision-specifying FLIT is sent on a channel other than the request channel REQ, e.g. by using another FLIT on the data channel DAT or a response FLIT on the response channel RSP.

While FIG. 6 shows an example where read data is being sent from the HN 12 to the RN 4, a similar approach can be used when an SN 14 is sending read data to the HN 12, or when read data is being sent from any other sending node to a receiving node of the processing system 2.

Figure 7:
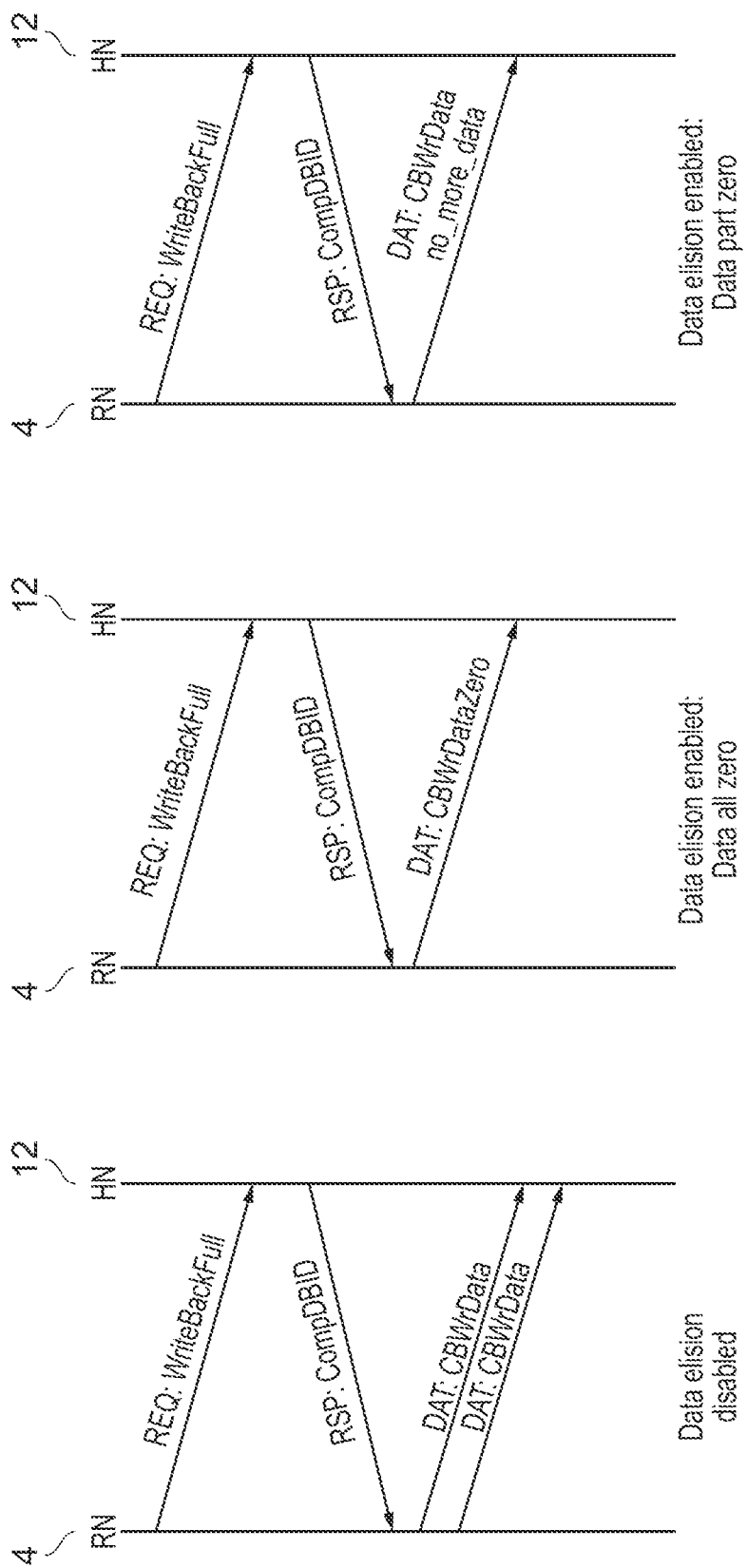
FIG. 7 illustrates use of data elision for write data in a write transaction.

FIG. 7 shows another example of a transaction flow when data elision is used for write data. In this case, the RN 4 is acting as the sender 30 and the HN 12 is acting as the recipient 40. Again, the left hand ladder diagram illustrates an example where data elision is disabled. The RN 4 issues a write request FLIT on the request channel REQ. The HN 12 responds with a response FLIT (which may for example provide an identifier DBID to be used by the RN for when subsequently sending data FLITs so that the HN 12 can track progress of transactions using the DBID). In response to the response FLIT, the RN 4 proceeds to send one or more data FLITs transmitting the write data for the write transaction. Again, in this example there are two data FLITs, but other examples may use a different number of data FLITs in the write transaction.

The middle ladder diagram in FIG. 7 illustrates an example when data elision is enabled and the write data to be sent is found by the determining circuitry 34 to contain all bits equal to zero. In this case, all of the data FLITs can be omitted from being sent and instead a response channel FLIT (CBWrDataZero) indicating that all the write data is zero can be sent via the response channel RSP. For example a new response FLIT opcode value could be assigned for identifying the new type of response channel FLIT which indicates that no write data is being sent because it is all equal to 0.

The right-hand ladder diagram in FIG. 7 illustrates a similar example where data elision is enabled and the write data to be sent is found to be partly zero so that while at least one data FLIT is still sent by the RN 4 to the HN 12 to convey non-zero portions of data, that data FLIT (CCWr-Data) acts as a data-elision-specifying FLIT and specifies a field identifying that at least one other FLIT was omitted from being sent and can be deduced by the HN 12 to represent data having a value of 0.

Hence, again this shows how data elision can help to conserve data channel bandwidth. FIG. 7 illustrates that, as the data elision information is signalled using the response channel FLIT or the data channel FLIT, then this means that it is possible to use the data elision for the write data even if, at the time of issuing the write request FLIT (WriteBack-Full) to initiate the write transaction, it was not yet known that at least part of the data to be sent would contain bit values all equal to 0. By enabling a later determination of whether the data is all zero, this means that a more powerful mechanism is provided enabling data elision to be used to a much greater extent than if the write request FLIT initiating a write transaction was the only means supported for indicating use of data elision.

Again, while FIG. 7 illustrates use of data elision for write data sent from an RN 4 to an HN 12, data elision could also be used in cases where the write data is sent from the HN 12 as sender 30 to an SN 14 as recipient 40, or where write data is sent between any other pair of sending and requesting nodes.

Figure 8:
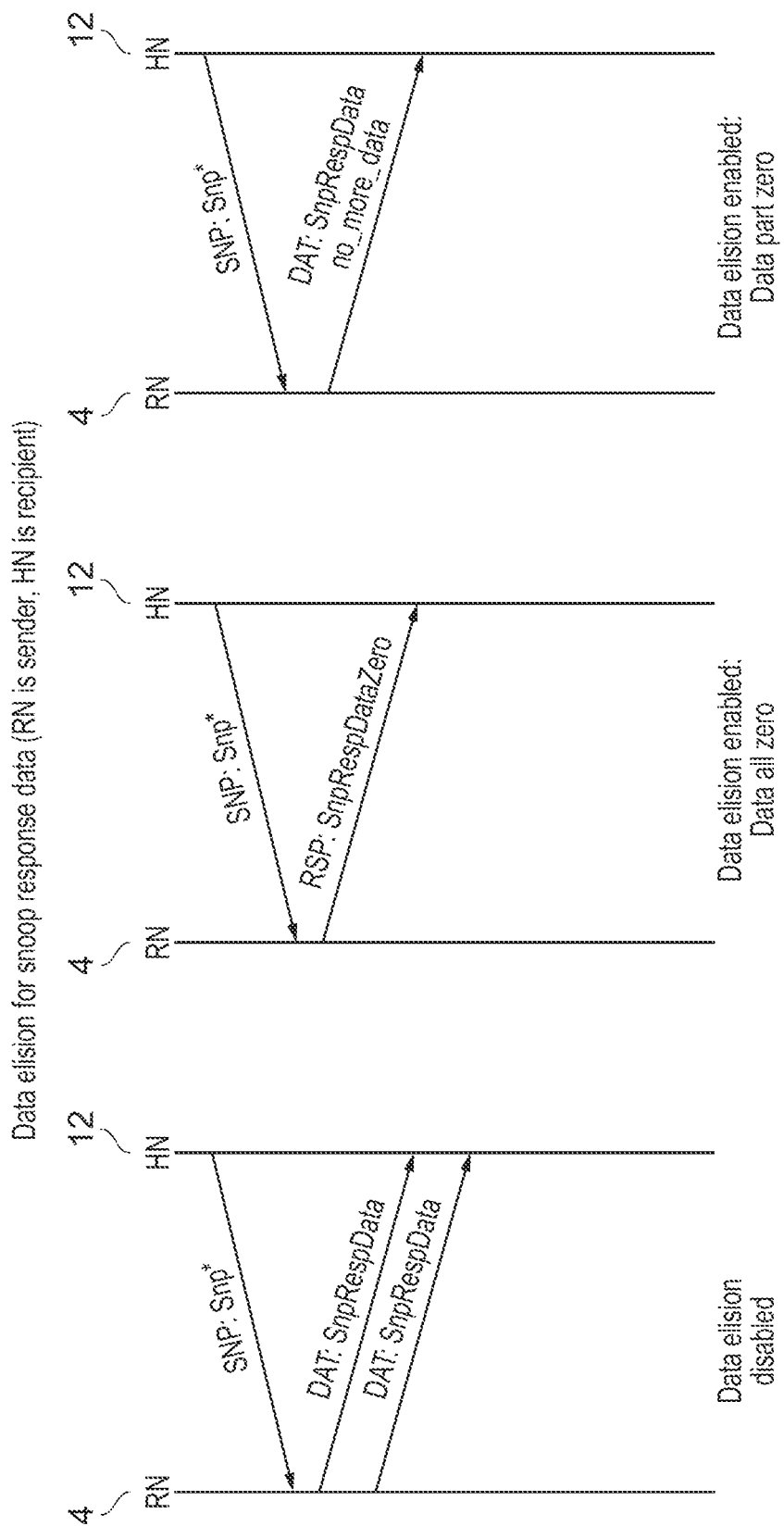
FIG. 8 illustrates use of data elision for snoop response data.

FIG. 8 illustrates use of data elision for snoop response data sent by an RN 4 acting as sender 30 to an HN 12 acting as recipient 40. In this case the RN 4 that is sending the snoop response data is not the RN 4 which originally sent the request FLIT to initiate the transaction flow which required the HN 12 to snoop the RN 4 as shown in FIG. 8. For example, during a read or write transaction flow as shown in the examples of FIG. 6 or 7, the HN 12 may determine that there is a risk of data corresponding to the target address of the read/write transaction being cached in a private cache 6 of another RN and so may issue a snoop request (Snp*) to that other RN to query coherency status or trigger a cache cleaning or invalidation operation if necessary. Depending on the particular type of snoop request sent on the snoop channel and the coherency state of the snooped address in the private cache 6 of the snooped RN 4, sometimes the RN 4 may need to respond with one or more data FLITs sending the snooped data to the HN, following which the HN 12 could either forward the data to the requesting RN which initiated the read/write transaction that caused the snoop, or the HN 12 could write back the received data to the system cache 10 or to main memory 16. Hence, the left hand ladder diagram in FIG. 8 shows the flow when data elision is disabled, and in this case in response to the snoop request (Snp*) received on the snoop channel SNP the RN 4 replies with one or more data FLITs (in this case, two data FLITS, but again the number of data FLITs can vary).

The middle ladder diagram in FIG. 8 shows an example where data elision is enabled and the determining circuitry 34 of the RN 4 determines that all the data to be sent in response the snoop request is zero and so instead a response FLIT (SnpRespDataZero, acting as data-elision-specifying FLIT) is sent on the response channel RSP to signal that all the snooped data was zero, without sending any data FLITS on the data channel. Again, an opcode field of the response FLIT may be defined to have a new value indicating the new type of message (SnpRespDataZero) which indicates a snoop response for which all the data has been elided as it was zero.

The right-hand ladder diagram in FIG. 8 shows another example where data elision is enabled and the snooped data was only partly zero and in this case, similar to the examples in FIGS. 6 and 7, a data FLIT (SnpRespData) sent for non-zero data specifies data-elision information (no_more_data, or alternatively the NumZero field described further below) specifying that at least one other data FLIT was elided and can be assumed to represent a portion of data equal to 0.

While FIG. 8 shows an example where the recipient 40 is the HN 12, it is also possible for snoop data to be forwarded directly to the requesting RN which initiated the corresponding read/write transaction, and in this case the requesting RN 4 could act as recipient 40.

Again, FIG. 8 shows a scenario where the sender of data on the data channel is not the RN 4 which sent the request FLIT to initiate the transaction flow, and so this demonstrates another scenario where using a data channel FLIT or response channel FLIT to signal the data-elision information can be beneficial, instead of using a request FLIT.

The data-elision information can be encoded in a number of different ways, and in general the data-elision information can be any information included in the data-elision-specifying FLIT that allows the recipient to determine that at least one data FLIT was not sent, and to reconstruct the data that would have been sent if the full number of data FLITs of the transaction had been sent. For example the data-elision information could be signalled using specialised opcodes designating new FLIT types to signal the data-elision information, or by adding a data-elision field to an existing type of FLIT to signal the data-elision information. It may be useful for the data-elision information to provide an indication of how many data FLITs have been omitted from being sent in the data elision, and this could be represented in different ways, for example either representing the total number of data FLITs that were actually sent, or representing the number of data FLITs that were suppressed from being sent.

Figure 9:
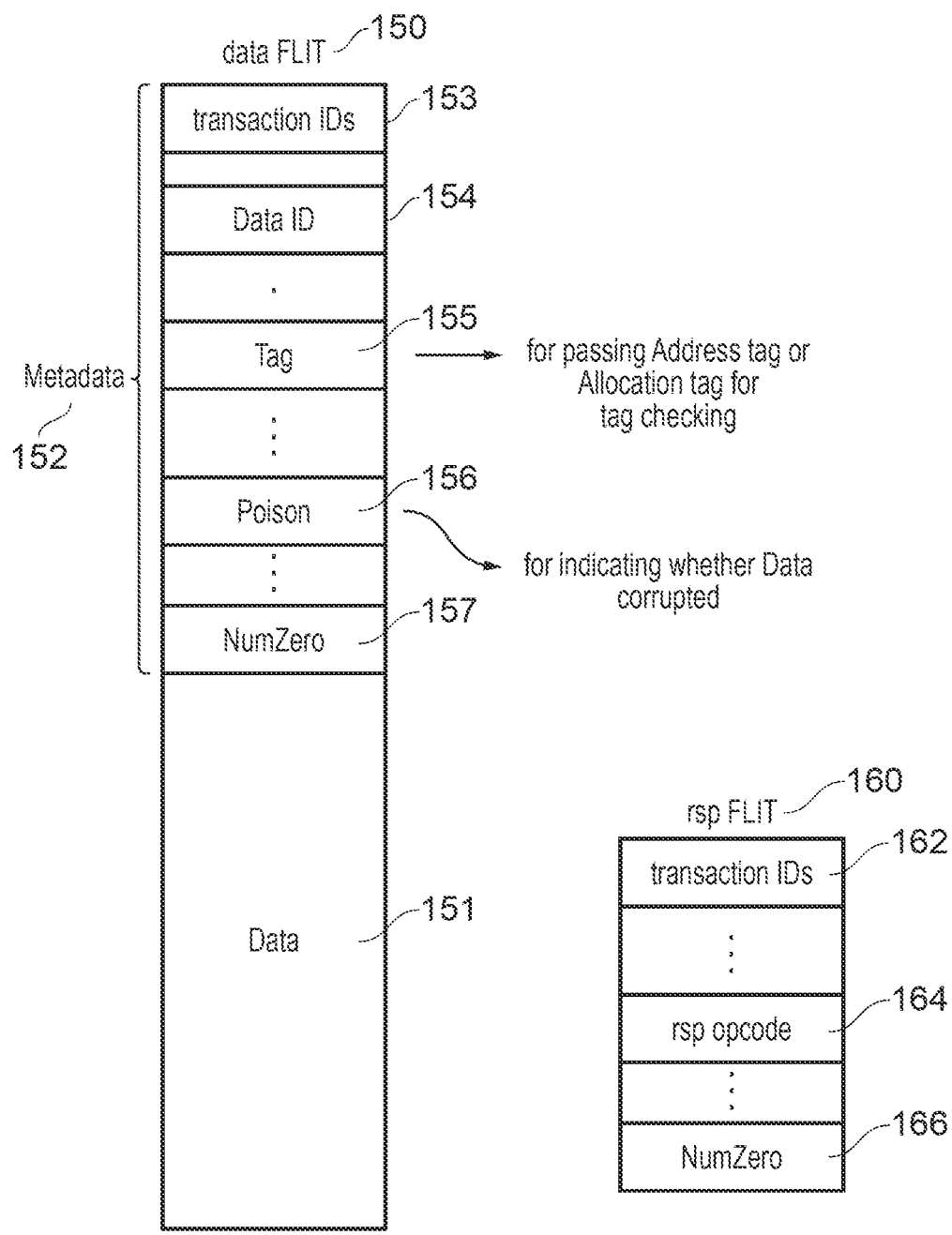
FIG. 9 illustrates an example of a data FLIT and a response FLIT.

FIG. 9 shows a particular example in which the data elision field is a field "NumZero" which indicates the number of data FLITs which were omitted from being sent because they were found to relate to data that is all 0. FIG. 9 illustrates an example format of a data FLIT 150 and a response FLIT 160 which can both serve as examples of the data-elision-specifying FLIT as discussed earlier. The determining circuitry 34 may select whether to use the data channel data-elision-specifying FLIT 150 or the response channel data-elision-specifying FLIT 160 for signalling data elision, based on whether the data to be sent to the recipient in a given transaction is entirely zero or only partially zero.

In this example, the data FLIT 150 includes the data payload 151 itself and metadata 152 which provides information relating to the data being transferred. It will be appreciated that FIG. 9 shows only a subset of the information that could be included in the metadata 152, and other information could also be provided. In this example, the metadata 152 includes:

One or more transaction identifiers 153 used to identify the transaction to which the data FLIT 150 belongs. It can be useful in some cases to support two or more transaction identifiers, for example a first transaction identifier allocated by the RN 4 that initiated the transaction and a second transaction identifier allocated by the HN 12 to differentiate transactions received from different RNs 4 which could have been assigned the same first transaction identifier to different transactions.

A data identifier 154 used, for a transaction that in the absence of use of data elision would have required two or more data FLITs to be sent, to distinguish the relative position of the payload data 151 within the overall set of data transmitted in the two or more data FLITs.

A tag field 155 used, in implementations which support memory tagging as discussed further below with respect to FIG. 13, to pass an address tag or an allocation tag for use in tag checking.

A poison field 156 used to signal that the transmitted data 151 has been detected to have been corrupted (for example, the corruption could be detected using error detecting codes).

A data elision field (NumZero) 157 used to signal the data elision information when the data FLIT 150 acts as the data-elision-specifying FLIT.

In this example, the response FLIT 160 includes the following information (again, it will be appreciated that other information could also be included):

One or more transaction identifiers 162 which are similar to the transaction identifiers 153 of the data FLIT 150, in that they are used to distinguish the transaction to which the response FLIT belongs (again there may be at least two separate transaction IDs, e.g. one allocated by the RN 4 and another allocated by the HN 12).

A response opcode 164 indicating what type of response message is represented by the response FLIT 160. As discussed above, at least one encoding of the response opcode field 164 can be assigned to represent that the response FLIT 160 is a data-elision-specifying FLIT indicating that all the data FLITs of the corresponding transaction were omitted from being sent because the data of those FLITs was equal to a predetermined value. There can be two or more different opcode values which may each represent different types of data-elision-specifying FLIT (for example, the data-elision-specifying response FLITs CompDataZero, CBWrDataZero, SnpRespDataZero in the examples of FIGS. 6, 7 and 8 respectively could be represented by different response opcodes). Alternatively, some implementations may represent the data-elision-specifying response FLIT using the same opcode that would be used for response FLITs used to send other types of response message which do not signal data elision, and in that case the data elision field 166 could be used to determine whether the response FLIT should be treated as a data-elision-specifying FLIT.

A data elision field (NumZero) 166 used to signal data elision information when the response FLIT 160 acts as the data-elision-specifying FLIT. This field is not necessary, because the size of the data which is completely elided in the case when the response FLIT is used can also be deduced from a size parameter sent in an earlier request FLIT of the transaction, but the NumZero field 166 of the response FLIT can be provided to ease implementation of the recipient. For example, the NumZero field could be used by the recipient to decrement a counter used to track when all the data FLITs of the transaction have been received, which could make it easier for the recipient to detect when there will be no further FLITs expected.

FIG. 10 illustrates an example encoding for the NumZero field 158, 166 in the data FLIT and response FLIT respectively. The width of the data channel implemented at a given communication link of the interconnect network may vary, and so the data width of the data payload 151 can take different values for FLITs sent at different portions of the system (or alternatively, even if all portions of the system 2 use the same channel width, one implementation of the system 2 may use a different data channel width to another). The "request size", representing the overall size of the data requested to be transferred in a given transaction may also vary from transaction to transaction. In this example, both the channel data width and the request size are shown as varying between 128 bits and 512 bits, but of course other data channel widths or request sizes would be possible. Note that the channel data width refers to the size of the data payload 151 of a data FLIT, excluding the metadata 152, so the data FLIT itself may be larger than the indicated channel data width. In the absence of data elision, the total number of data FLITs transmitted would correspond to the request size divided by the data size.

When a response FLIT is used to signal data elision information, the NumZero field 166 indicating the number of data FLITs that were elided may be set to the total number of data FLITs that would otherwise have been sent (i.e. the full number of data FLITs that would normally have been sent for that transaction). When a data FLIT is used to signal data elision information, the NumZero field 158 may indicate the number of data FLITs that were omitted from being sent, which will be less than the full number of data FLITs that would normally have been sent in the absence of data elision (this means that the data FLIT may have a NumZero field 158 with one fewer bit than the NumZero field 166 in the response FLIT because the data FLIT does not need to encode the full number of FLITs that would normally have been sent). Hence, the NumZero field 158 of the data FLIT enables the recipient 40 to deduce how many data FLITs are actually to be transmitted as indicated in the fourth column of the left hand table of FIG. 10. This encoding enables a consistent definition of the NumZero field to be used for both the data FLIT and the response FLIT which can make processing of the data elision information simpler at the recipient 40. This approach also means that the data elision information is invariant to possible reordering of the order in which the remaining data FLITs (that are still sent to transmit non-zero data portions) are received at the recipient 40. In the case where the data FLIT is used to send the data-elision information because only part of the data was zero, the data ID field 154 of those data FLITs that are still sent can be used to deduce the missing data ID values of those omitted data FLITS not sent so that the positions of the zero data within the overall set of data being sent in the transaction can be deduced.

The example above assumes that the predetermined value signalled by the data elision information is zero, which can be expected to provide the greatest performance improvement given the frequency with which data values of zero are transmitted between different storage locations of the memory system. However, it would also be possible to use a similar signal mechanism to signal that other values (e.g. a value with all bits set to 1) have been omitted from being sent and can be reconstructed at the recipient. If the protocol supports more than one type of predetermined value that can be signalled as implicitly transmitted using data elision (without actually transmitting the predetermined value itself), then the data elision information may also include information distinguishing which of the two or more predetermined values is represented for a particular transfer.

Figure 11:
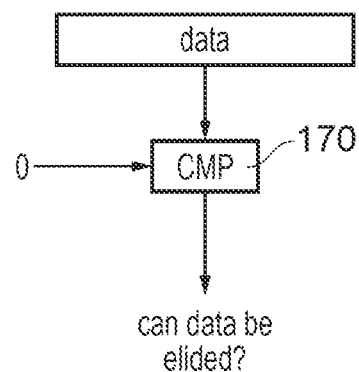
FIG. 11 shows an example of analysing bits of a portion of data to be sent, to determine whether the portion of data has a predetermined value enabling data elision to be used.
Figure 12:
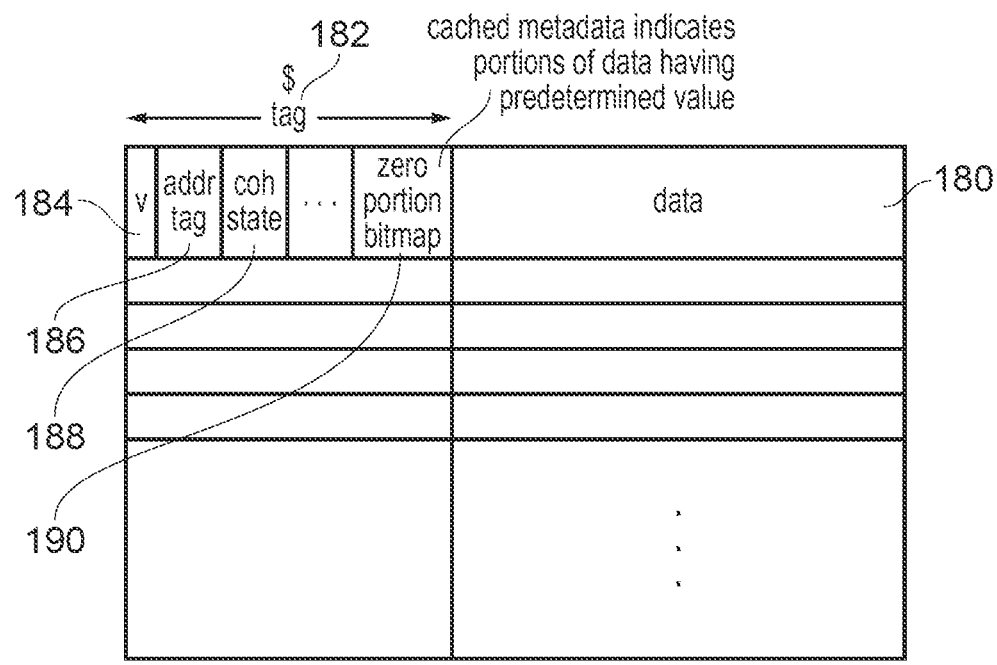
FIG. 12 shows an example where cached metadata is used to determine whether a portion of cached data to be sent to the recipient has the predetermined value.

FIGS. 11 and 12 show ways in which the determining circuitry 34 at the sender 30 can determine whether a portion of data awaiting sending has the predetermined value. As shown in FIG. 11, one approach can be to provide a comparator 170 or other set of circuit logic to analyse bits of the data to determine whether the data can be elided because it has the predetermined value. As shown in FIG. 12, alternatively if the data to be transmitted is derived from cached data 180 stored within a cache 6, 10, then the determining circuitry 34 could determine whether the data to be transmitted has the predetermined value based on cached metadata 190 stored as part of tag information 182 in association with the cached data 180. For example, the tag information 182 may typically include various information used for looking up the cache (e.g. a valid indicator 184 and address tag 186 for detecting whether the cache entry contains valid information relating to a particular address), and an indication of the coherency state 188 of the cached data, for use in responding to snoop requests from the interconnect 8. The tag 182 could be extended to include an additional field 190 specifying an indicator of which portions of the cached data 180 have the predetermined value. For example, the metadata field 190 may specify a portion bitmap which comprises a number of bits each specifying whether a corresponding portion of the data 180 has the predetermined value (e.g. 0). The metadata field 190 can be calculated at the time of updating the cached data 180 in the cache entry. When reading the cached data 180 from the cache when the data is to be sent to the recipient 40, the determining circuitry 34 can determine from the portion bitmap 190 whether a given portion has the predetermined value. This can be less costly in terms of power consumption and latency than analysing the bits of the data itself 180. As the same cached data 180 may be written once but read for transmission multiple times, this approach can save power and improve performance (removing the analysis of the data 180 itself from a critical timing path) compared to analysing the data 180 itself to detect whether it has the predetermined value every time cached data is read out to be sent over the interconnect 4.

Figure 13:
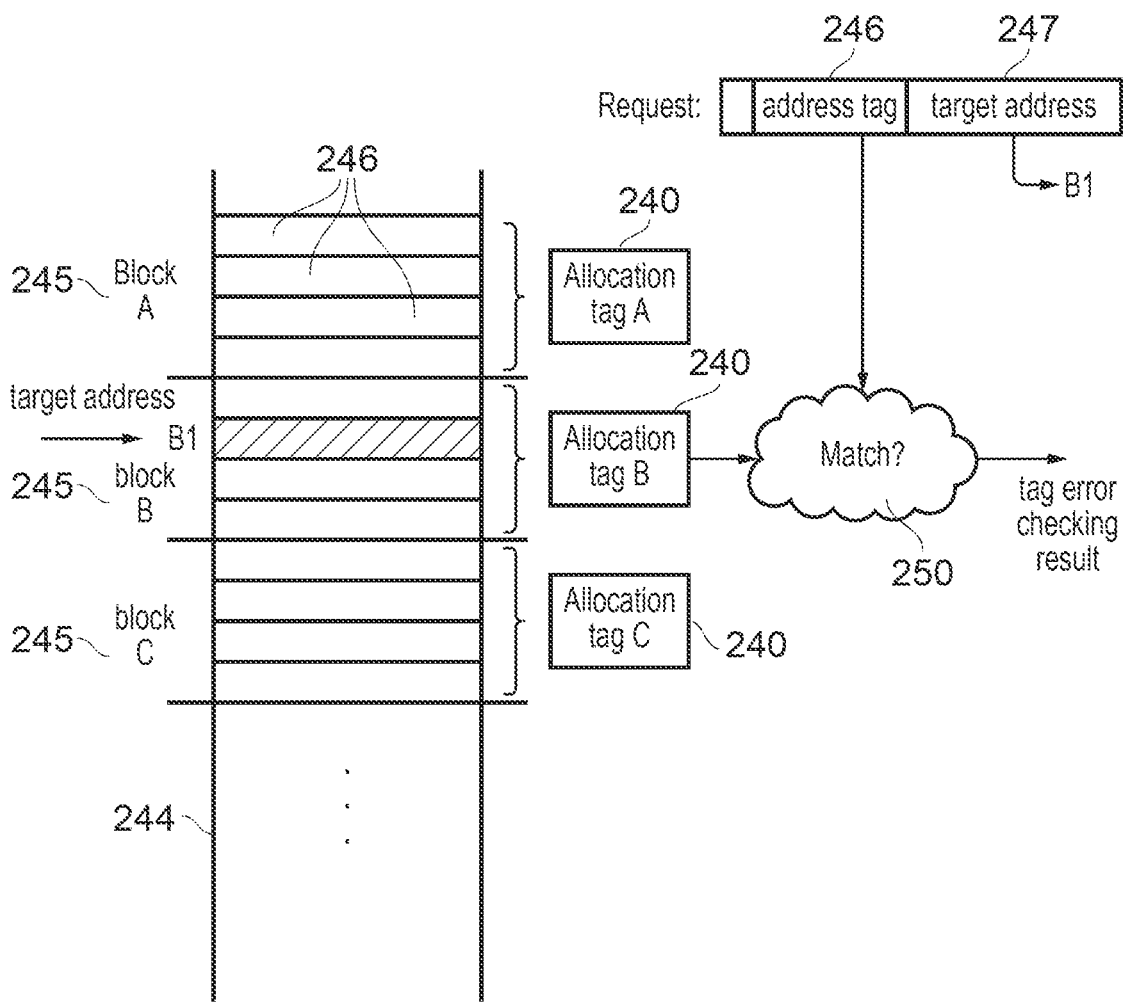
FIG. 13 illustrates a tag checking operation.

FIG. 13 illustrates the concept of memory tagging, which can be used to deal with the problem that some higher level programming languages, such as C and C++, are considered memory-unsafe in that they do not include run time error detection checks for checking for certain errors relating to memory accesses. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

One approach for protecting against certain memory usage errors of the type discussed above may be to provide allocation tags which are stored in a memory system in association with blocks of one or more memory locations. When a tag-guarded memory access operation is requested based on a target address identifying a particular addressed location in the memory system (e.g. the tag-guarded memory access operation could be a memory access operation requested when the processor is operating in a tag checking mode), tag checking circuitry may compare an address tag that is associated with the target address with an allocation tag that is stored in the memory system in association with a block of one or more memory locations which includes the addressed location identified by the target address. The tag checking circuitry may generate an indication of whether a match is detected between the allocation tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can generate instructions that, when regions of memory are initialised, cause the allocation tags for blocks of memory which the code is expected to access to be set to particular values, and associate matching address tag values with the pointers used to provide target addresses pointing to those blocks. If a memory usage error occurs, and for example the address pointer is used out of scope or extends out of the bounds of the valid range which was initialised, then it may be likely that the allocation tag associated with the addressed location may not match the address tag associated with the target address, and then the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

Hence, as shown in FIG. 13, when a tag checking mode is supported, the physical address space 244 used to refer to memory locations within the memory system may be logically partitioned into a number of blocks 245 each comprising a certain number of addressable locations 246. For conciseness, in the example of FIG. 13, each block 245 comprises four memory locations 246, but other block sizes could be used as well. Each block 245 is associated with a corresponding allocation tag 240. The allocation tags associated with a certain number of blocks 245 can be gathered together and stored either within a different architecturally accessible memory location within the physical address space, or within additional storage locations provided in the memory system which are not architecturally accessible (not mapped to the same physical address space). The particular mapping of which tag storage locations correspond to each block 245 may be hardwired or could be programmable.

Hence, when a tag-guarded memory access is required (e.g. certain memory access instruction opcodes could be assigned to denote tag-guarded memory accesses, or alternatively any memory access issued when operating in a tag checking mode could be considered tag-guarded), an address tag 246 (which is associated with the target address 247 identifying the addressed location to be accessed), is compared against the allocation tag 240 which is associated with the block of memory locations 245 which includes the addressed location. For example, in FIG. 13 the target address 247 points to a certain location B1 in memory. Therefore, the allocation tag B which is associated with the block of locations B including location B1 is compared by tag checking circuitry 250 against the address tag 246 associated with the target address 247. As shown at the top of FIG. 13, the address tag 246 may be determined as a function of selected bits of the target address 247 itself. In particular, the address tag may be determined from bits within a portion of the target address which is unused for indicating the specific memory location which is to be selected as the addressed location 44 (selection of the target location B1 does not depend on these bits). For example, in some architectures the top portion of bits of the target address may always have a certain fixed value such as a sign extension (all 0s or all 1s) and so an address can be tagged with the address tag 246 by overwriting these unused bits with an arbitrary tag value. The particular address tag value can be selected by a programmer or compiler for example. The address tag 246 and allocation tag 240 can be a relatively small number of bits, e.g. 4 bits, and so need not occupy much space within memory storage and within the target address. Providing 4 bits of tag space, i.e. 16 possible values of the tags, can often be enough to detect many common types of memory access errors.

Hence, when a tag-guarded memory access is performed, the tag checking circuitry 250 compares the address tag 246 associated with the target address with the allocation tag 240 associated with a block 245 of memory locations including the addressed location B1, and determines whether they match. The tag checking circuitry 250 generates a match indication indicating whether the address tag 246 and the allocation tag 240 matched. For example, this match indication could be a fault signal which is generated if there is a mismatch between the address tag 246 and the allocation tag 250, triggering an exception handler to deal with the cause of the fault. Also, the match indication could be an indication placed in a status register indicating whether there was a match, or an entry added to an error report to indicate the address for which the error was detected and/or the instruction address of the instruction which triggered the error. Some implementations may prevent the memory access which causes a tag check error from being successful, while other approaches may allow the memory access to proceed despite the tag check error, but record the error in an error log which could be made available to a software provider of the code to assist the provider with eliminating errors in subsequent versions of the software. Hence, it will be appreciated that there are a range of ways in which the tag match/mismatch indication could be generated by the tag checking circuitry 250.

In embodiments which use a portion of the target address 247 to determine the address tag 246, note that this address tag is different to a tag portion of the target address which may be used by caches 6, 10 to determine whether the information from the addressed location identified by the target address is stored within the cache. As shown in FIG. 12, many caching schemes may store a tag portion 186 of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache, would be part of the portion of the address which actually identifies the particular addressed location for which the data is required, i.e. changing the cache tag portion of an address would by definition result in the address pointing to a different addressed location within the memory system. In contrast, with the address tag used for the tag-guarded memory operation, the memory access circuitry may select the addressed location for which data is required independent of the address tag. That is, even if the address tag 246 is set to different values, the addressed location B1 referenced by the target address may still be the same as the selection of the addressed location B1 depends only on other portions of the target address 247. This gives the freedom for compilers to set the address tags associated with particular addresses to any value to match the corresponding allocation tag values which have been allocated to the relevant blocks of data in the memory system.

The tag checking circuitry 250 can be located at different parts of the system 2. In some instances the tag checking circuitry may be located within a processing element (e.g. CPU, GPU etc.), i.e. at the RN 4 shown in FIG. 1. Other examples may locate the tag checking circuitry closer to the memory storage 16 which stores the accessed data and tags. Hence, depending on the location of the tag checking circuitry 250, the tag field 155 of the data FLIT 150 may either be used to pass an address tag from the RN 4 to the tag checking circuitry 250 located closer to the memory storage, or be used to pass an allocation tag from the tag storage location to the tag checking circuitry within the RN 4 for comparing against an Address tag. Also, the tag field 155 can be used when setting Allocation tags for regions of memory to indicate the tag value to be used for the Allocation tags. Hence, the tag field 155 can serve a range of purposes for representing tag values for use in tag checking operations.

When a tag checking mode is used, one side effect of omitting transmission of data FLIT 150 due to data elision may be that it is no longer possible to provide for transmission of tag values associated with the elided data having the predetermined value for the purpose of tag checking, as the response FLIT 160 may not have any field allocated for tag values, and when the data-elision-specifying FLIT is another data FLIT 150 sending data not having the predetermined value, then the tag field 155 of that other data FLIT 150 would already be used to provide the tag values associated with the data being transmitted in that other data FLIT 150. Hence, in a tag checking mode, data elision could be disabled by the determining circuitry 34 of the sender 30 so that even if a portion of data to be sent has a predetermined value, an explicitly transmitted data FLIT would still be sent to convey that portion of data having the predetermined value, so that the corresponding tag information 155 can also be transmitted for the purpose of tag checking.

Another example when data elision could be disabled is when the data to be transmitted which has the predetermined value is found to be corrupted so that the poison field 156 of the corresponding data FLIT 150 would be set to indicate corrupted data. Again, the response FLIT 160 may not have space for the poison field 156, and another data FLIT 150 used to signal data elision may already be using the poison field 156 to indicate whether or not the data transmitted by that other data FLIT 150 is poisoned due to corruption, so it may be preferable to disable data elision for the transmission of the data FLIT 150 representing the poisoned data, even if the data has the predetermined value, so that the recipient can determine the important information that the data has become corrupted.

It will be appreciated that there may also be other scenarios in which it may be preferred to disable data elision so that a data FLIT 150 can still be sent even if its payload 151 would have the predetermined value (e.g. if the recipient does not support data elision, or there is another piece of information available only in data FLITs that is desired to be sent in association with the data having the predetermined value).

Figure 14:
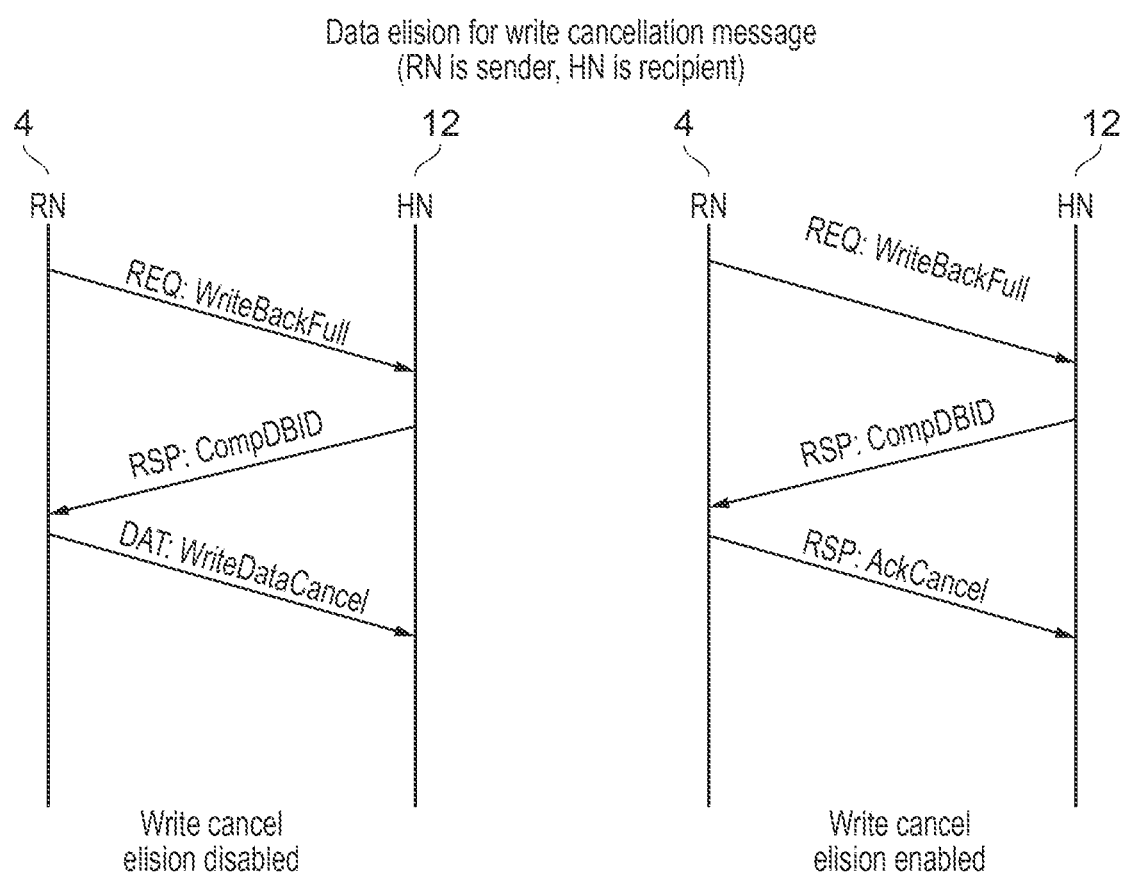
FIG. 14 illustrates use of data elision for a write cancellation message.

FIG. 14 illustrates another example where elision of information on the data channel can be used, in this case when sending a write cancellation message (WriteDataCancel) from the RN 4 to the HN 12, to indicate that, after the write request FLIT (WriteBackFull) for a write transaction has already been sent, it was subsequently decided by the RN 4 that the write transaction is no longer required and so the write cancellation message is sent. In the absence of write cancel elision, the write cancellation message would be sent on the data channel DAT as shown in the left-hand ladder diagram of FIG. 14. However, when write cancel elision is enabled then the write cancellation message (AckCancel) can instead be sent as a response FLIT 160 on the response channel RSP which frees up extra bandwidth on the data channel which could be used for other transactions which have not been cancelled. The interconnect protocol used by the system may support both the data-channel write cancellation FLIT shown in the left hand ladder diagram of FIG. 14 and the response-channel write cancellation FLIT shown in the right hand ladder diagram of FIG. 14, to provide flexibility to vary which approach is used depending on whether the recipient 40 of the write cancellation FLIT supports write cancel elision and on whether other information only available on the data channel DAT needs to be transmitted. An additional response FLIT opcode value may be assigned for the opcode field 164 of the response FLIT to represent the response-channel write cancellation FLIT (AckCancel).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Examples are set out in the following clauses:
(1) An apparatus comprising: data sending circuitry to send data to a recipient over an interconnect; and determining circuitry to determine whether a portion of data to be sent by the data sending circuitry has a predetermined value; in which: in response to the determining circuitry determining that the portion of data has the predetermined value, the data sending circuitry is configured to perform data elision to: omit sending at least one data FLIT corresponding to the portion of data having the predetermined value; and send a data-elision-specifying FLIT specifying data-elision information indicating to the recipient that sending of the at least one data FLIT has been omitted and that the recipient can proceed assuming the portion of data has the predetermined value, where said data-elision-specifying FLIT is a FLIT other than a write request FLIT for initiating a memory write transaction sequence.
(2) The apparatus according to clause (1), in which the predetermined value is zero.
(3) The apparatus according to any of clauses (1) and (2), in which the data sending circuitry is configured to perform the data elision for data which, in the absence of the data elision, would be sent as a response to a read request FLIT or snoop request FLIT received from the interconnect.
(4) The apparatus according to any preceding clause, in which the data sending circuitry is configured to perform the data elision for write data which, in the absence of the data elision, would be sent in a subsequent FLIT after the write request FLIT of the memory write transaction sequence.
(5) The apparatus according to clause (4), in which the determining circuitry is configured to determine whether the portion of data has the predetermined value after the write request FLIT for the memory write transaction sequence has already been sent by the data sending circuitry.
(6) The apparatus according to any preceding clause, in which the data-elision-specifying FLIT is another data FLIT sent by the data sending circuitry to send another portion of data having a value other than the predetermined value.
(7) The apparatus according to any preceding clause, in which the interconnect comprises a plurality of channels including at least:
a data channel to send data FLITs; and
a response channel to send response FLITs.
(8) The apparatus according to clause (7), in which the data-elision-specifying FLIT is a response FLIT sent on the response channel.
(9) The apparatus according to any of clauses (7) and (8), in which the determining circuitry is configured to determine, depending on whether all data FLITs to be sent from the sender to the recipient for a given transaction correspond to data having the predetermined value, whether the data sending circuitry should send, as the data-elision-specifying FLIT, a data FLIT on the data channel or a response FLIT on the response channel.
(10) The apparatus according to clause (9), in which the determining circuitry is configured to determine that a data FLIT should be sent on the data channel as the data-elision-specifying FLIT, when at least one of the data FLITs to be sent from the sender to the recipient for the given transaction corresponds to data having a value other than the predetermined value.
(11) The apparatus according to any of clauses (9) and (10), in which the determining circuitry is configured to determine that a response FLIT should be sent on the response channel as the data-elision-specifying FLIT, when all of the data FLITs to be sent from the sender to the recipient for the given transaction correspond to data having the predetermined value.
(12) The apparatus according to any of clauses (7) to (11), in which the data sending circuitry is capable of sending a data-channel write cancel FLIT on the data channel to indicate that, following sending of the write request FLIT to initiate a memory write transaction sequence, the memory write transaction sequence is to be cancelled; and
the data sending circuitry is also capable of sending a response-channel write cancel FLIT on the response channel to indicate that, following sending of the write request FLIT to initiate a memory write transaction sequence, the memory write transaction sequence is to be cancelled.

(13) The apparatus according to any preceding clause, in which the data-elision information provides information enabling the recipient to determine how many data FLITs would have been transmitted for a given transaction sequence had the data elision not been performed.

(14) The apparatus according to any preceding clause, in which the data-elision information is indicative of how many data FLITs are omitted in the data elision.

(15) The apparatus according to any preceding clause, in which when the data elision is disabled, the data sending circuitry is configured to send the at least one data FLIT corresponding to the portion of data, despite the portion of data having the predetermined value.

(16) The apparatus according to clause (15), in which the data sending circuitry is configured to disable the data elision when the recipient cannot support use of the data elision.

(17) The apparatus according to any of clauses (15) and (16), comprising tag checking circuitry to perform, when a tag checking mode is enabled, a tag checking operation to determine whether an address tag associated with a target address of a memory access request corresponds to an allocation tag stored in a memory system associated with a block of one or more addresses comprising the target address;
a data FLIT specifies a tag field to provide an allocation tag value or address tag value for the tag checking operation; and
the data sending circuitry is configured to disable the data elision when the tag checking mode is enabled.

(18) The apparatus according to any of clauses (15) to (17), in which a data FLIT specifies a poison field to indicate whether at least part of data sent in the data FLIT is corrupted; and
the data sending circuitry is configured to disable the data elision when at least part of the portion of data is corrupted.

(19) The apparatus according to any preceding clause, in which the determining circuitry is configured to determine whether the portion of data has the predetermined value by analysing bits of the portion of data.

(20) The apparatus according to any preceding clause, in which when the portion of data to be sent is obtained from a cache, the determining circuitry is configured to determine whether the portion of data has the predetermined value based on cached metadata associated with the cached data, the cached metadata indicative of whether the portion of cached data has the predetermined value.

(21) An apparatus comprising:
data receiving circuitry to receive data from a sender over an interconnect; and
data elision processing circuitry to detect receipt of a data-elision-specifying FLIT specifying data-elision information indicating that at least one data FLIT corresponding to a portion of data having a predetermined value has been omitted from being sent by the sender, and in response to detecting the receipt of the data-elision-specifying FLIT, to proceed assuming the portion of data has the predetermined value, where said data-elision-specifying FLIT is a FLIT other than a write request FLIT for initiating a memory write transaction sequence.

(22) A computer-readable storage medium to store computer-readable code for fabrication of the apparatus of any of clauses (1) to (20).

(23) A method comprising: determining whether a portion of data to be sent to a recipient over an interconnect has a predetermined value; and in response to determining that the portion of data has the predetermined value, performing data elision to: omit sending at least one data FLIT corresponding to the portion of data having the predetermined value; and send a data-elision-specifying FLIT specifying data-elision information indicating to the recipient that sending of the at least one data FLIT has been omitted and that the recipient can proceed assuming the portion of data has the predetermined value, where said data-elision-specifying FLIT is a FLIT other than a write request FLIT for initiating a memory write transaction sequence.

(24) A method comprising:
receiving FLITs from a sender over an interconnect;
detecting whether a received FLIT is a data-elision-specifying FLIT specifying data-elision information indicating that at least one data FLIT corresponding to a portion of data having a predetermined value has been omitted from being sent by the sender; and
in response to detecting that the received FLIT is the data-elision-specifying FLIT, proceeding assuming the portion of data has the predetermined value;
where said data-elision-specifying FLIT is a FLIT other than a write request FLIT for initiating a memory write transaction sequence.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
data sending circuitry to send data to a recipient over an interconnect; and
determining circuitry to determine whether a portion of data to be sent by the data sending circuitry has a predetermined value; in which:
in response to the determining circuitry determining that the portion of data has the predetermined value, the data sending circuitry is configured to perform data elision to:
omit sending at least one data FLIT corresponding to the portion of data having the predetermined value; and
send a data-elision-specifying FLIT specifying data-elision information indicating to the recipient that sending of the at least one data FLIT has been omitted and that the recipient can proceed assuming the portion of data has the predetermined value, to enable the recipient to reconstruct the omitted at least one data FLIT without the at least one data FLIT being sent by the data sending circuitry, where said data-elision-specifying FLIT is a FLIT other than a write request FLIT for initiating a memory write transaction sequence; and the data-elision-specifying FLIT is another data FLIT sent by the data sending circuitry to send another portion of data having a value other than the predetermined value.

2. The apparatus according to claim 1, in which the predetermined value is zero.

3. The apparatus according to claim 1, in which the data sending circuitry is configured to perform the data elision for data which, in the absence of the data elision, would be sent as a response to a read request FLIT or snoop request FLIT received from the interconnect.

4. The apparatus according to claim 1, in which the data sending circuitry is configured to perform the data elision for write data which, in the absence of the data elision, would be sent in a subsequent FLIT after the write request FLIT of the memory write transaction sequence.

5. The apparatus according to claim 4, in which the determining circuitry is configured to determine whether the portion of data has the predetermined value after the write request FLIT for the memory write transaction sequence has already been sent by the data sending circuitry.

6. The apparatus according to claim 1, in which the interconnect comprises a plurality of channels including at least:
    a data channel to send data FLITs; and
    a response channel to send response FLITs.

7. The apparatus according to claim 6, in which the data sending circuitry is configured to also support transmitting, as the data-elision-specifying FLIT, a response FLIT sent on the response channel.

8. The apparatus according to claim 6, in which the determining circuitry is configured to determine, depending on whether all data FLITs to be sent from the sender to the recipient for a given transaction correspond to data having the predetermined value, whether the data sending circuitry should send, as the data-elision-specifying FLIT, a data FLIT on the data channel or a response FLIT on the response channel.

9. The apparatus according to claim 6, in which the data sending circuitry is capable of sending a data-channel write cancel FLIT on the data channel to indicate that, following sending of the write request FLIT to initiate a memory write transaction sequence, the memory write transaction sequence is to be cancelled; and
    the data sending circuitry is also capable of sending a response-channel write cancel FLIT on the response channel to indicate that, following sending of the write request FLIT to initiate a memory write transaction sequence, the memory write transaction sequence is to be cancelled.

10. The apparatus according to claim 1, in which the data-elision information provides information enabling the recipient to determine how many data FLITs would have been transmitted for a given transaction sequence had the data elision not been performed.

11. The apparatus according to claim 1, in which the data-elision information is indicative of how many data FLITs are omitted in the data elision.

12. The apparatus according to claim 1, in which when the data elision is disabled, the data sending circuitry is configured to send the at least one data FLIT corresponding to the portion of data, despite the portion of data having the predetermined value.

13. The apparatus according to claim 12, in which the data sending circuitry is configured to disable the data elision when the recipient cannot support use of the data elision.

14. The apparatus according to claim 12, comprising tag checking circuitry to perform, when a tag checking mode is enabled, a tag checking operation to determine whether an address tag associated with a target address of a memory access request corresponds to an allocation tag stored in a memory system associated with a block of one or more addresses comprising the target address;
    a data FLIT specifies a tag field to provide an allocation tag value or address tag value for the tag checking operation; and
    the data sending circuitry is configured to disable the data elision when the tag checking mode is enabled.

15. The apparatus according to claim 12, in which a data FLIT specifies a poison field to indicate whether at least part of data sent in the data FLIT is corrupted; and
    the data sending circuitry is configured to disable the data elision when at least part of the portion of data is corrupted.

16. The apparatus according to claim 1, in which the determining circuitry is configured to determine whether the portion of data has the predetermined value by one of:
    analysing bits of the portion of data; or
    when the portion of data to be sent is obtained from a cache, based on cached metadata indicative of whether the portion of cached data has the predetermined value.

17. An apparatus comprising:
    data receiving circuitry to receive data from a sender over an interconnect; and
    data elision processing circuitry to detect receipt of a data-elision-specifying FLIT specifying data-elision information indicating that at least one data FLIT corresponding to a portion of data having a predetermined value has been omitted from being sent by the sender, and in response to detecting the receipt of the data-elision-specifying FLIT, to reconstruct the at least one data FLIT assuming the portion of data has the predetermined value, where said data-elision-specifying FLIT is a FLIT other than a write request FLIT for initiating a memory write transaction sequence;
    in which the data-elision-specifying FLIT is another data FLIT providing another portion of data having a value other than the predetermined value.

18. A non-transitory computer-readable medium to store computer-readable code for fabrication of the apparatus of claim 1.

19. A method comprising:
    determining whether a portion of data to be sent to a recipient over an interconnect has a predetermined value; and
    in response to determining that the portion of data has the predetermined value, performing data elision to:
        omit sending at least one data FLIT corresponding to the portion of data having the predetermined value; and
        send a data-elision-specifying FLIT specifying data-elision information indicating to the recipient that sending of the at least one data FLIT has been omitted and that the recipient can proceed assuming the portion of data has the predetermined value, to enable the recipient to reconstruct the omitted at least one data FLIT without the at least one data FLIT being sent by the data sending circuitry, where said data-elision-specifying FLIT is a FLIT other than a write request FLIT for initiating a memory write transaction sequence; and the data-elision-specifying FLIT is another data FLIT sent by the data sending circuitry to send another portion of data having a value other than the predetermined value.

* * * * *